United States Patent
Nammi et al.

(10) Patent No.: US 9,276,707 B2
(45) Date of Patent: *Mar. 1, 2016

(54) METHODS OF COMMUNICATING DATA INCLUDING SHARED ACK/NACK MESSAGES AND RELATED WIRELESS TERMINALS AND NETWORK NODES

(71) Applicant: Telefonaktiebolaget L M Ericsson (publ), Stockholm (SE)

(72) Inventors: Sairamesh Nammi, Stockholm (SE); Anders Jonsson, Täby (SE); Fredrik Ovesjö, Älvsjö (SE); Namir Lidian, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,382

(22) Filed: May 20, 2015

(65) Prior Publication Data

US 2015/0256295 A1 Sep. 10, 2015

Related U.S. Application Data

(63) Continuation of application No. 13/820,282, filed as application No. PCT/SE2013/050089 on Feb. 4, 2013, now Pat. No. 9,148,258.

(60) Provisional application No. 61/596,369, filed on Feb. 8, 2012, provisional application No. 61/613,450, filed on Mar. 20, 2012.

(51) Int. Cl.
*H04L 1/18* (2006.01)
*H04L 1/08* (2006.01)
(Continued)

(52) U.S. Cl.
CPC ............ *H04L 1/08* (2013.01); *H04B 7/0413* (2013.01); *H04L 1/1657* (2013.01);
(Continued)

(58) Field of Classification Search
CPC ....... H04L 1/08; H04L 1/0071; H04L 1/1671; H04L 1/1845; H04L 1/1893; H04L 5/0023; H04L 5/006; H04L 5/0042; H04L 5/0055
See application file for complete search history.

(56) References Cited

U.S. PATENT DOCUMENTS

2007/0263746 A1  11/2007  Son
2008/0192718 A1  8/2008  Jongren et al.
(Continued)

FOREIGN PATENT DOCUMENTS

EP  2 048 807 A2  4/2009
EP  2 234 308 A1  9/2010
(Continued)

OTHER PUBLICATIONS

European Search Report Corresponding to European Patent Application No. 13 74 6308; Dated: Jun. 1, 2015; 11 Page.
(Continued)

*Primary Examiner* — Sam Rizk
(74) *Attorney, Agent, or Firm* — Myers Bigel & Sibley, P.A.

(57) ABSTRACT

A method of transmitting data from a wireless network node over a MIMO channel to a wireless terminal may include transmitting first and second transport data blocks to the wireless terminal over the MIMO channel. Responsive to receiving a NACK message from the wireless terminal corresponding to the first and second transport data blocks, the first and second transport data blocks may be retransmitted to the wireless terminal over the MIMO channel.

32 Claims, 13 Drawing Sheets

(51) Int. Cl.
| | |
|---|---|
| *H04L 5/00* | (2006.01) |
| *H04L 1/00* | (2006.01) |
| *H04L 1/16* | (2006.01) |
| *H04B 7/04* | (2006.01) |

(52) U.S. Cl.
CPC .......... *H04L 1/1845* (2013.01); *H04L 1/1887* (2013.01); *H04L 1/1893* (2013.01); *H04L 5/006* (2013.01); *H04L 5/0023* (2013.01); *H04L 5/0042* (2013.01); *H04L 5/0055* (2013.01); *H04B 7/0486* (2013.01); *H04L 1/0071* (2013.01); *H04L 1/1671* (2013.01); *H04L 1/1896* (2013.01)

(56) References Cited

U.S. PATENT DOCUMENTS

| | | |
|---|---|---|
| 2008/0232449 A1 | 9/2008 | Khan |
| 2008/0304463 A1 | 12/2008 | Borkar et al. |
| 2008/0304464 A1 | 12/2008 | Borkar et al. |
| 2009/0098876 A1* | 4/2009 | Khan et al. ............... 455/445 |
| 2010/0131813 A1 | 5/2010 | Kim et al. |
| 2010/0316159 A1 | 12/2010 | Bo et al. |
| 2011/0051824 A1 | 3/2011 | Kim et al. |
| 2011/0142147 A1 | 6/2011 | Chen |
| 2012/0269137 A1 | 10/2012 | Kang et al. |
| 2013/0028213 A1 | 1/2013 | Ko et al. |

FOREIGN PATENT DOCUMENTS

| | | |
|---|---|---|
| WO | WO 02/01749 A2 | 1/2002 |
| WO | WO 2008/054313 A1 | 5/2008 |
| WO | WO 2009/087198 A2 | 7/2009 |
| WO | WO 2009/088167 A1 | 7/2009 |
| WO | WO 2009/137646 A2 | 11/2009 |
| WO | WO 2012/095188 A1 | 7/2012 |

OTHER PUBLICATIONS

Lee et al. "Simplified Maximum-Likelihood Precoder Selection for Spatial Multiplexing Systems", *IEEE Transactions on Vehicular Technology*, vol. 59, No. 9, Nov. 2010, pp. 4628-4634.

International Search Report and Written Opinion Corresponding to International Application No. PCT/SE2013/050089; Date of Mailing: Sep. 30, 2013; 15 pp.

International Preliminary Report on Patentability Corresponding to International Application No. PCT/SE2013/050089; Date of Issuance: Aug. 12, 2014; 9 pp.

3GPP TS 25.321 V10.8.0 (Dec. 2012), 3$^{rd}$ Generation Partnership Project; Technical Specification Group Radio Access Network; Medium Access Control (MAC) protocol specification (Release 10), 198 pp.

3GPP TS 25.321 V11.0.0 (Dec. 2011) "Technical Specification Group Radio Access Network"; 3$^{rd}$ Generation Partnership Project; Medium Access Control (MAC) Protocol Specification (Release 11), 198 pp.

3GPP TS 25.321 V11.3.0 (Dec. 2012) "Technical Specification Group Radio Access Network"; 3$^{rd}$ Generation Partnership Project; Medium Access Control (MAC) Protocol Specification (Release 11), 207 pp.

Alcatel-Lucent et al. "HARQ retransmission in UL MIMO", 3GPP TSG-RAN WG1 Meeting #69, R1-122464, Prague, Czech Republic, May 21-25, 2012, 5 Pages.

Ericsson, "4-branch MIMO for HSDPA", 3GPP TSG-RAN WG1 Meeting #65, R1-111763; Barcelona, Spain, May 9-13, 2011, 17 pp.

Ericsson, "Data Bundling in a 2 codeword MIMO System", 3GPP TSG-RAN WG1 Meeting #68, R1-120356; Dresden, Germany, Feb. 6-10, 2012, 9 pp.

Ericsson, "Feedback Channel Design for four branch MIMO System", 3GPP TSG-RAN WG1 Meeting #68, R1-120361; Dresden, Germany, Feb. 6-10, 2012, 7 pp.

Ericsson, "Introduction of 4Tx_HSDPA in 25.331", 3GPP TSG-RAN WG2 Meeting #79bis, [*Draft*] R2-125043, Change Request, 25.331, Version 11.3.0; Bratislava, Slovakia, Oct. 8-12, 2013, 131pp.

Ericsson, "Introduction of 4Tx_HSDPA", TSG-RAN1 Meeting #70bis, R1-124506, Change Request, 25.212, Version 11.0.0; San Diego, USA, Oct. 8-12, 2012, 45pp.

Ericsson, "New WI: Four Branch MIMO transmission for HSDPA (core part)", 3GPP TSG-RAN Meeting #53, RP-111393, vol. 13.1.2; Fukuoka, Japan, Sep. 13-16, 2011, 6 pp.

Ericsson, "New WI: Four Branch MIMO transmission for HSDPA (feature part)", 3GPP TSG-RAN Meeting #53, RP-111393, vol. 13.1.2; Fukuoka, Japan, Sep. 13-16, 2011, 5 pp.

Ericsson, "New WI: Four Branch MIMO transmission for HSDPA (performance part)", 3GPP TSG-RAN Meeting #53, RP-111393, vol. 13.1.2; Fukuoka, Japan, Sep. 13-16, 2011, 5 pp.

Ericsson, "Selection of transport blocks with 2 codeword in four branch MIMO", 3GPP TSG-RAN WG2 Meeting #77, R2-120798; Dresden, Germany, Feb. 6-10, 2012, 3 pp.

Ericsson, "Transmission and Reception Procedures with DTX codeword in a Four branch MIMO System", 3GPP TSG-RAN WG1 #70bis, R1-124502, San Diego, USA, Oct. 8-12, 2012, 3 pages.

Ericsson: "Retransmission Operations in a 2 Codeword MIMO System" R1-122814, 3GPP TSG-RAN WG1 #69, Prague, Czech Republic, May 21-25, 2012, 8 pp.

ETSI TS 125 321 V10.5.0 (Jan. 2012), Technical Specification, Universal Mobile Telecommunications System (UMTS); Medium Access Control (MAC) protocol specification (3GPP TS 25.321 version 10.5.0 Release 10), 202 pp.

ETSI TS 136 211 V10.4.0 (Jan. 2012), Technical Specification, LTE; Evolved Universal Terrestrial Radio Access (E-UTRA); Physical channels and modulation (3GPP TS 36.211 version 10.4.0 Release 10), 103 pp.

ETSI TS 136 321 V10.4.0 (Jan. 2012), Technical Specification, LTE; Evolved Universal Terrestrial Radio Access (E-UTRA); Medium Access Control (MAC) protocol specification (3GPP TS 36.321 version 10.4.0 Release 10), 56 pp.

Freescale Semiconductor Inc. "EUTRA Downlink MIMO configurations and comparisons", 3GPP TSG RAN WG1 #43, Tdoc R1-060248, Helsinki, Finland, Jan. 23-25, 2006, 5 Pages.

Huawei et al. "Retransmission for 4-branch MIMO", 3GPP TSG-RAN WG1 Meeting #70, R1-123819, Qingdao, China, Aug. 13-17, 2012, 6 Pages.

I. Emre Telatar, "Capacity of Multi-antenna Gaussian Channels", Lucent Technologies, Bell Laboratories, Murray Hill, NJ, Oct. 1995; *European Transactions on Telecommunications*, vol. 1, No. 6, pp. 585-595, Nov./Dec. 1999.

I. Emre Telatar: "Capacity of Multi-antenna Gaussian Channels" Tech. Rep, 1995: Bell Labs, Lucent Technologies, 28 pages.

Nokia Siemens Networks, "Dual code word retransmission", 3GPP TSG RAN WG1 Meeting #70, R1-123718, Qingdao, P.R. China, Aug. 13-17, 2012, 3 Pages.

Qualcomm Europe "PDCCH Formats and Contents", 3GPP TSG-RAN WG1 #51, R1-074951, Jeju, Korea, Nov. 5-9, 2007, 7 Pages.

Samsung, "Considerations on codewords to layers mapping for downlink MIMO", 3GPP TSG RAN WG1 Meeting #47bis, R1-070130; Sorrento, Italy, Jan. 15-19, 2007, 8pp.

Thomas Salzer, Huawei—HSPA session chairman, "Summary of 4-branch MIMO for HSPA session", 3GPP TSG-RAN WG1 Meeting #67, R1-114366, Item 6.4; San Francisco, CA USA, Nov. 14-18, 2011, 2 pp.

IEEE Standard for Information technology; Telecommunications and information exchange between systems; Local and metropolitan area networks; Specific requirements; Part 11: Wireless LAN Medium Access Control (MAC) and Physcial Layer (PHY) Specifications; Amendment 5: Enhancements for Higher Throughput, IEEE Computer Society, Oct. 29, 2009, 536 pages.

* cited by examiner

Figure 7A

| | HARQ process | |
|---|---|---|
| | 1st HARQ | 2nd HARQ |
| 4Tx Streams Combinations | Stream 1, Stream 2 | Stream 3, Stream 4 |
| | Stream 1, Stream 3 | Stream 2, Stream 4 |
| | Stream 1, Stream 4 | Stream 2, Stream 3 |

Figure 7B

| | HARQ process | |
|---|---|---|
| | 1st HARQ | 2nd HARQ |
| 3Tx StreamsCombinations | Stream 1, Stream 2 | Stream 3 |
| | Stream 1, Stream 3 | Stream 2 |
| | Stream 1 | Stream 2, Stream 3 |

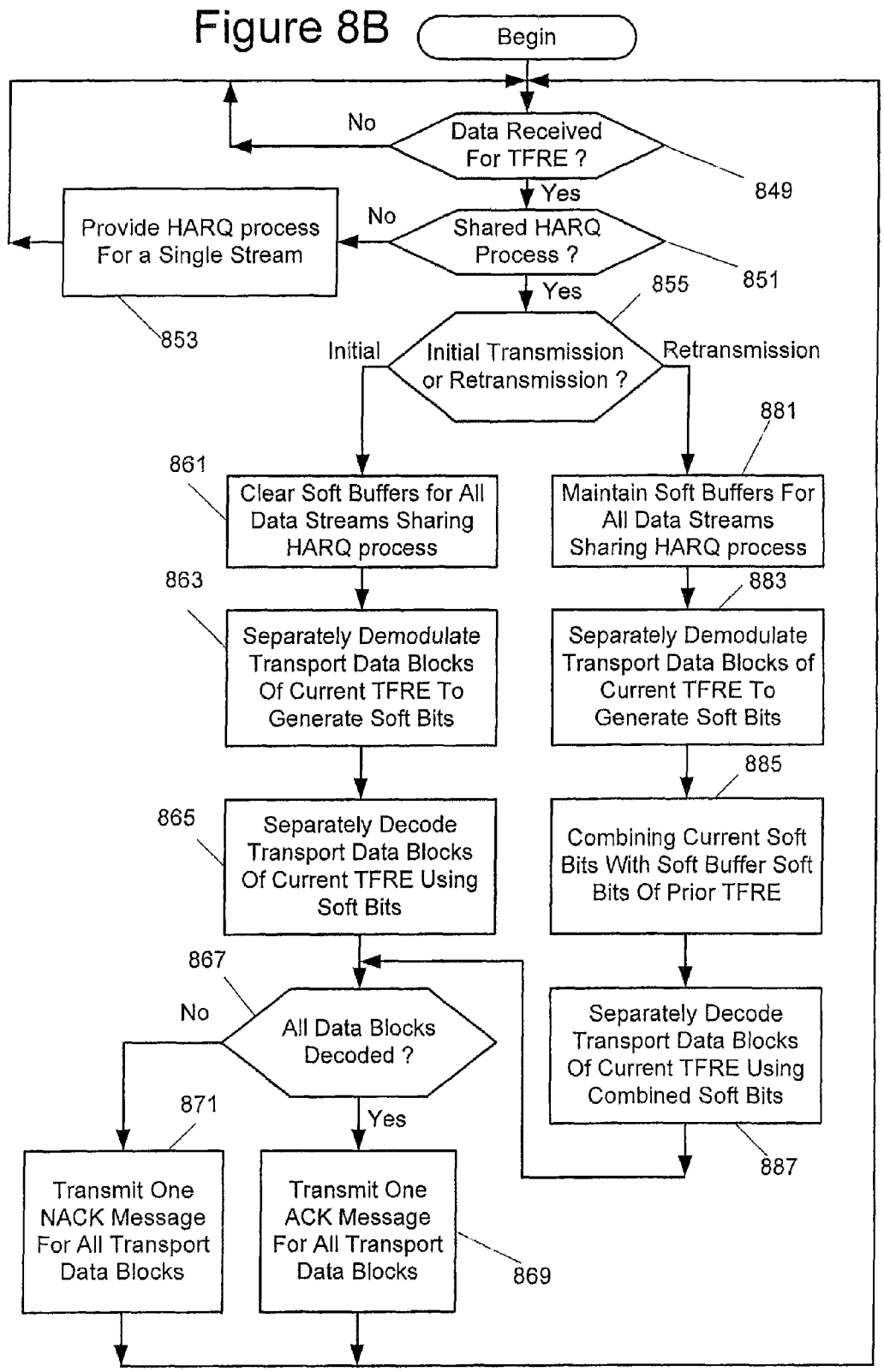

| Input HARQ Process | | Input HARQ Process |
|---|---|---|
| 1st Stream | 2nd Stream | |
| ACK | ACK | ACK |
| ACK | NAK | NAK |
| NAK | ACK | NAK |
| NAK | NAK | NAK |

# METHODS OF COMMUNICATING DATA INCLUDING SHARED ACK/NACK MESSAGES AND RELATED WIRELESS TERMINALS AND NETWORK NODES

CROSS REFERENCE TO RELATED APPLICATIONS

This application claims the benefit of priority as a continuation of U.S. application Ser. No. 13/820,282, filed on 1 Mar. 2013, which is a 35 U.S.C. §371 national stage application of PCT International Application No. PCT/SE2013/050089, filed on 4 Feb. 2013, which claims the benefit of priority from U.S. Provisional Application No. 61/596,369, filed on 8 Feb. 2012, and from U.S. Provisional Application No. 61/613,450, filed 20 Mar. 2012. The disclosures of all of the above-referenced applications are hereby incorporated herein in their entireties by reference.

TECHNICAL FIELD

The present disclosure is directed to wireless communications and, more particularly, to multiple-input-multiple-output (MIMO) wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Moreover, a cell area for a base station may be divided into a plurality of sectors surrounding the base station. For example, a base station may service three 120 degree sectors surrounding the base station, and the base station may provide a respective directional transceiver and sector antenna array for each sector. Stated in other words, a base station may include three directional sector antenna arrays servicing respective 120 degree base station sectors surrounding the base station.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from a sector antenna array over a MIMO channel to a wireless terminal in the sector, for example, spatial multiplexing (or SM) may allow the simultaneous transmission of multiple symbol streams over the same frequency from the base station sector antenna array for the sector. Stated in other words, multiple symbol streams may be transmitted from the base station sector antenna array for the sector to the wireless terminal over the same downlink time/frequency resource element (TFRE) to provide an increased data rate. In a downlink from the same base station sector transmitting from the same sector antenna array to the same wireless terminal, transmit diversity (e.g., using space-time codes) may allow the simultaneous transmission of the same symbol stream over the same frequency from different antennas of the base station sector antenna array. Stated in other words, the same symbol stream may be transmitted from different antennas of the base station sector antenna array to the wireless terminal over the same time/frequency resource element (TFRE) to provide increased reliability of reception at the wireless terminal due to transmit diversity gain.

Four layer MIMO transmission schemes are proposed for High-Speed-Downlink-Packet-Access (HSDPA) within Third Generation Partnership Project (3GPP) standardization. Accordingly, up to 4 channel encoded transport data blocks (sometimes referred to as transport data block codewords) may be transmitted using a same TFRE when using 4-branch MIMO transmission. Because ACK/NACK signaling and/or channel encoding for each transport data block to be transmitted during a same TFRE may require wireless terminal feedback (e.g., as ACK/NACK and/or CQI or channel quality information), feedback to define ACK/NACK and/or channel encoding for 4 transport data blocks may be required when using 4-branch MIMO transmission. Feedback signaling when using 4-branch MIMO transmission may thus be undesirably high, for example, because different MIMO layers may be received at a wireless terminal during a same TFRE with different qualities, signal strengths, error rates, etc.

SUMMARY

It may therefore be an object to address at least some of the above mentioned disadvantages and/or to improve performance in a wireless communication system.

According to some embodiments, a method of transmitting data from a wireless network node over a MIMO channel to a wireless terminal may include transmitting first and second transport data blocks to the wireless terminal over the MIMO channel using a first time-frequency-resource-element (TFRE). Responsive to receiving a NACK message from the wireless terminal (200) corresponding to the first and second transport data blocks transmitted using the first TFRE, the first and second transport data blocks may be retransmitted to the wireless terminal (200) over the MIMO channel using a second TFRE.

Responsive to receiving the NACK message from the wireless terminal corresponding to the first and second transport data blocks transmitted using the first TFRE, a data indicator may be transmitted to the wireless terminal for the second TFRE to indicate retransmission of both of the first and second transport data blocks using the second TFRE. The data indicator may be a one bit data indicator indicating retransmission of both of the first and second transport data blocks.

Responsive to receiving an ACK message from the wireless terminal corresponding to the first and second transport data blocks transmitted using the second TFRE, third and fourth transport data blocks may be transmitted to the wireless terminal over the MIMO channel using a third TFRE.

Responsive to receiving the ACK message from the wireless terminal corresponding to the first and second transport data blocks retransmitted using the second TFRE, a data indicator may be transmitted to the wireless terminal for the third TFRE to indicate initial transmission of both of the third and fourth transport data blocks using the third TFRE.

A third transport data block may be transmitted to the wireless terminal over the MIMO channel using the first TFRE. Responsive to receiving a NACK message from the wireless terminal corresponding to the third transport data block transmitted using the first TFRE, the third transport data block may be retransmitted to the wireless terminal over the MIMO channel using the second TFRE.

Responsive to receiving the NACK message from the wireless terminal corresponding to the third transport data block transmitted using the first TFRE, a data indicator may be transmitted to the wireless terminal for the second TFRE to indicate retransmission of the third transport data block using the second TFRE.

Responsive to receiving an ACK message from the wireless terminal corresponding to the third transport data block transmitted using the first TFRE, a fourth transport data block may be transmitted to the wireless terminal (200) over the MIMO channel using the second TFRE.

Responsive to receiving an ACK message from the wireless terminal corresponding to the first and second transport data blocks transmitted using the first TFRE, third and fourth transport data blocks may be transmitted to the wireless terminal over the MIMO channel using the second TFRE.

Responsive to receiving the ACK message from the wireless terminal corresponding to the first and second transport data blocks transmitted using the first TFRE, a data indicator may be transmitted to the wireless terminal for the second TFRE to indicate initial transmission of both of the third and fourth transport data blocks using the second TFRE.

The NACK message may be a first NACK message, and third and fourth transport data blocks may be transmitted to the wireless terminal over the MIMO channel using the first TFRE. Responsive to receiving a second NACK message from the wireless terminal corresponding to the third and fourth transport data blocks transmitted using the first TFRE, the third and fourth transport data blocks may be retransmitted to the wireless terminal over the MIMO channel using the second TFRE. The first transport data block may be transmitted using a first MIMO transmission stream, the third transport data block may be transmitted using a second MIMO transmission stream, the fourth transport data block may be transmitted using a third MIMO transmission stream, and the second transport data block may be transmitted using a fourth MIMO transmission stream.

According to some other embodiments, a wireless network node may be configured to provide wireless communication with a wireless terminal over a MIMO channel. The wireless network node may include a transceiver configured to transmit communications to the wireless terminal and to receive communications from the wireless terminal, and a processor coupled to the transceiver. The processor may be configured to transmit first and second transport data blocks through the transceiver to the wireless terminal over the MIMO channel using a first time-frequency-resource-element (TFRE), and to retransmit the first and second transport data blocks through the transceiver to the wireless terminal over the MIMO channel using a second TFRE responsive to receiving a NACK message from the wireless terminal through the transceiver corresponding to the first and second transport data blocks transmitted using the first TFRE.

The NACK message may be a first NACK message, and the processor may be further configured to transmit third and fourth transport data blocks to the wireless terminal over the MIMO channel using the first TFRE, and to retransmit the third and fourth transport data blocks to the wireless terminal over the MIMO channel using the second TFRE responsive to receiving a second NACK message from the wireless terminal corresponding to the third and fourth transport data blocks transmitted using the first TFRE. Moreover, the first transport data block may be transmitted using a first MIMO transmission stream, the third transport data block may be transmitted using a second MIMO transmission stream, the fourth transport data block may be transmitted using a third MIMO transmission stream, and the second transport data block may be transmitted using a fourth MIMO transmission stream.

According to still other embodiments, a method of receiving data at a wireless terminal from a wireless network node over a MIMO channel may include receiving first and second transport data blocks from the wireless network node over the MIMO channel using a first time-frequency-resource-element (TFRE). Responsive to failing to decode at least one of the first and second transport data blocks, a NACK message corresponding to both of the first and second transport data blocks may be transmitted to the wireless network node.

Responsive to successfully decoding both of the first and second transport data blocks, an ACK message corresponding to both of the first and second transport data blocks may be transmitted to the wireless network node.

A third transport data block may be received from the wireless network node over the MIMO channel using the first time-frequency-resource-element (TFRE). Responsive to failing to decode the third transport data block, a NACK message corresponding to the third transport data block may be transmitted to the wireless network node.

Responsive to successfully decoding the third transport data block, an ACK message corresponding to the third transport data block may be transmitted to the wireless network node.

The NACK message may be a first NACK message, and third and fourth transport data blocks may be received from the wireless network node over the MIMO channel using the first TFRE. Responsive to failing to decode at least one of the third and fourth transport data blocks, a second NACK message corresponding to both of the third and fourth transport data blocks may be transmitted to the wireless network node. The first transport data block may be received using a first MIMO reception stream, the third transport data block may be received using a second MIMO reception stream, the fourth transport data block may be received using a third MIMO reception stream, and the second transport data block may be received using a fourth MIMO reception stream.

According to yet other embodiments, a wireless terminal may be configured to provide communication with a wireless network node over a MIMO channel. The wireless terminal may include a transceiver configured to transmit communications to the wireless network node and to receive communications from the wireless network node, and a processor coupled to the transceiver. The processor may be configured to receive first and second transport data blocks through the transceiver from the wireless network node over the MIMO channel using a first time-frequency-resource-element (TFRE), and to transmit a NACK message corresponding to both of the first and second transport data blocks through the transceiver to the wireless network node responsive to failing to decode at least one of the first and second transport data blocks.

The processor may be further configured to transmit an ACK message corresponding to both of the first and second transport data blocks through the transceiver to the wireless network node responsive to successfully decoding both of the first and second transport data blocks.

The NACK message may be a first NACK message, and the processor may be further configured to receive third and fourth transport data blocks through the transceiver from the wireless network node over the MIMO channel using the first TFRE, and to transmit a second NACK message corresponding to both of the third and fourth transport data blocks to the wireless network node responsive to failing to decode at least one of the third and fourth transport data blocks. The first transport data block may be received using a first MIMO reception stream, the third transport data block may be received using a second MIMO reception stream, the fourth transport data block may be received using a third MIMO reception stream, and the second transport data block may be received using a fourth MIMO reception stream.

According still other embodiments, a method of receiving data at a wireless terminal from a wireless network node over a MIMO channel may include receiving first and second transport data blocks over the MIMO channel using a first time-frequency-resource-element (TFRE), and receiving a data indicator corresponding to the first and second transport data blocks for the first TFRE. Responsive to the data indicator indicating that both of the first and second transport data blocks are initial transmissions of the first and second transport data blocks, the first and second transport data blocks may be decoded without combining with prior soft bits. Responsive to the data indicator indicating that both of the first and second transport data blocks are retransmissions of the first and second transport data blocks, a combination of the first transport data block and soft bits of a first soft buffer may be decoded, and a combination of the second transport data block and soft bits of a second soft buffer may be decoded. The data indicator may be a one bit data indicator.

Responsive to successfully decoding both of the first and second transport data blocks, an ACK message corresponding to both of the first and second transport data blocks may be transmitted to the wireless network node.

Responsive to failing to decode at least one of the first and second transport data blocks, a NACK message corresponding to both of the first and second transport data blocks may be transmitted to the wireless network node.

Responsive to failing to decode the first transport data block and successfully decoding the second transport data block, a NACK message corresponding to both the first and second transport data blocks may be transmitted to the wireless network node.

The data indicator may be a first data indicator, and a third transport data block may be received over the MIMO channel using the first time-frequency-resource-element (TFRE). A second data indicator corresponding to the third transport data block for the first TFRE may be received. Responsive to the second data indicator indicating that the third transport data block is an initial transmission of the third transport data blocks, the third transport data block may be decoded without combining with prior soft bits. Responsive to the second data indicator indicating that the third transport data block is a retransmission of the third transport data block, a combination of the third transport data block and soft bits of a third soft buffer may be decoded.

Responsive to successfully decoding the third transport data block, an ACK message corresponding to the third transport data block may be transmitted to the wireless network node. Responsive to failure decoding the third transport data block, a NACK message corresponding to the third transport data block may be transmitted to the wireless network node.

Responsive to the data indicator indicating that both of the first and second transport data blocks are initial transmissions of the first and second transport data blocks, the first and second soft buffers respectively corresponding to the first and second transport data blocks may be cleared.

According to more embodiments, a wireless terminal may be configured to provide communication with a wireless network node over a MIMO channel. The wireless terminal may include a transceiver configured to transmit communications to the wireless network node and to receive communications from the wireless network node, and a processor coupled to the transceiver. The processor may be configured to receive first and second transport data blocks over the MIMO channel through the transceiver using a first time-frequency-resource-element (TFRE), to receive a data indicator through the transceiver for the first and second transport data blocks for the first TFRE, to decode the first and second transport data blocks without combining with prior soft bits responsive to the data indicator indicating that both of the first and second transport data blocks are initial transmissions of the first and second transport data blocks, to decode a combination of the first transport data block and soft bits of a first soft buffer responsive to the data indicator indicating that both of the first and second transport data blocks are retransmissions, and to decode a combination of the second transport data block and soft bits of a second soft buffer responsive to the data indicator indicating that both of the first and second transport data blocks are retransmissions.

According to some more embodiments discussed herein, a method of transmitting data from a wireless network node (e.g., a base station) over a MIMO channel to a wireless terminal may include transmitting first and second transport data blocks to a the wireless terminal over the MIMO channel using a first time-frequency-resource-element (TFRE). A single NACK message may be received from the wireless terminal corresponding to the first and second transport data blocks, and the first and second transport data blocks may be retransmitted to the wireless terminal over the MIMO channel using a second time-frequency-resource element responsive to the single NACK message. Moreover, the network node may transmit a single data indicator (also referred to as an indicator or a new data indicator) to the wireless terminal for the second TFRE to indicate retransmission of both of the first and second transport data blocks.

According to still more embodiments discussed herein, a method of transmitting data from a wireless network node (e.g., a base station) over a MIMO channel to a wireless terminal may include transmitting first and second transport data blocks to a the wireless terminal over the MIMO channel using a first time-frequency-resource-element (TFRE). A single ACK message may be received from the wireless terminal corresponding to the first and second transport data blocks, and third and fourth transport data blocks may be transmitted to the wireless terminal over the MIMO channel using a second time-frequency-resource element responsive to the single ACK message. Moreover, the network node may transmit a single data indicator (also referred to as an indicator or a new data indicator) to the wireless terminal for the second TFRE to indicate initial transmission of both of the third and fourth transport data blocks.

According to yet more embodiments discussed herein, a method of receiving data at a wireless terminal from a wireless network node (e.g., a base station) over a MIMO channel may include receiving first and second transport data blocks from the wireless network node over the MIMO channel using a first time-frequency-resource-element (TFRE). Responsive to successfully decoding both of the first and second transport data blocks, a single ACK message corresponding to both of the first and second transport data blocks may be transmitted to the wireless network node Responsive to failing to decode at least one of the first and second transport data blocks, a single NACK message corresponding to both of the first and second transport data blocks may be transmitted to the wireless network node.

According to further embodiments discussed herein, a method of receiving data at a wireless terminal from a wireless network node (e.g., base station) over a MIMO channel may include receiving first and second transport data blocks over the MIMO channel using a first time-frequency-resource-element (TFRE). Responsive to receiving a single data indicator (also referred to as an indicator or a new data indicator) indicating that both of the first and second transport data blocks are initial transmissions of the first and second transport data blocks, soft buffers corresponding to both of the first and second transport data blocks may be cleared, and both of the first and second transport data blocks may be decoded without combining with prior soft bits. Responsive to receiving a single data indicator indicating that both of the first and second transport data blocks are retransmissions of the first and second transport data blocks, the first and second transport data blocks may be combined with soft bits of respective soft buffers, and the combinations of the first and second transport data blocks with the respective soft bits may be separately decoded.

BRIEF DESCRIPTION OF THE DRAWINGS

The accompanying drawings, which are included to provide a further understanding of the disclosure and are incorporated in and constitute a part of this application, illustrate certain non-limiting embodiment(s) of present inventive concepts. In the drawings:

FIGS. 7A and 7B are tables illustrating combinations of sharing HARQ processes between multiple MIMO data streams for rank/layer 3 and 4 MIMO transmissions;

FIGS. 8A and 8B are flow charts illustrating operations of base stations and wireless terminals according to some embodiments;

DETAILED DESCRIPTION

Figure 1A:
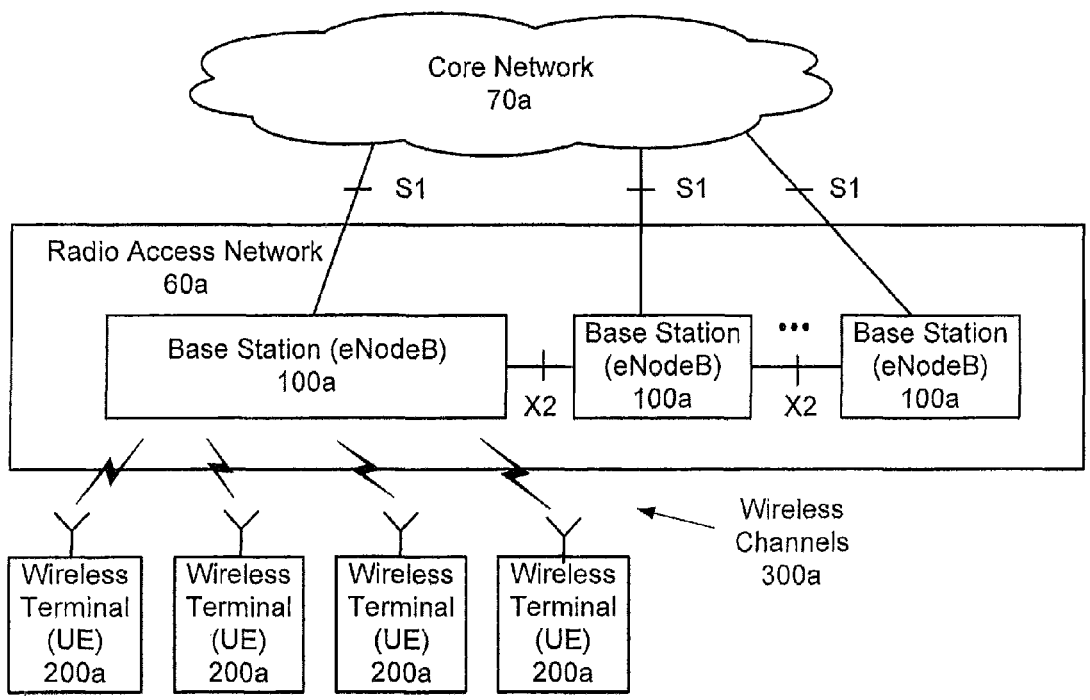
FIGS. 1A and 1B are block diagrams of communication systems that are configured according to some embodiments.

Present inventive concepts will now be described more fully hereinafter with reference to the accompanying drawings, in which examples of embodiments of present inventive concepts are shown. Present inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a RAN that communicates over radio communication channels with wireless terminals (also referred to as UEs). It will be understood, however, that present inventive concepts is not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of present inventive concepts, this should not be seen as limiting the scope of present inventive concepts to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts that are disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of present inventive concepts may also be applied, for example, in the uplink.

FIG. 1A is a block diagram of a communication system that is configured to operate according to some embodiments of present inventive concepts. An example RAN 60a is shown that may be a Long Term Evolution (LTE) RAN. Radio base stations (e.g., eNodeBs) 100a may be connected directly to one or more core networks 70a. In some embodiments, functionality of a radio network controller(s) may be performed by radio base stations 100a. Radio base stations 100a communicate over wireless channels 300a with wireless terminals (also referred to as user equipment nodes or UEs) 200a that are within their respective communication service cells (also referred to as coverage areas). The radio base stations 100a can communicate with one another through an X2 interface(s) and with the core network(s) 70a through S1 interfaces, as is well known to one who is skilled in the art.

Figure 1B:
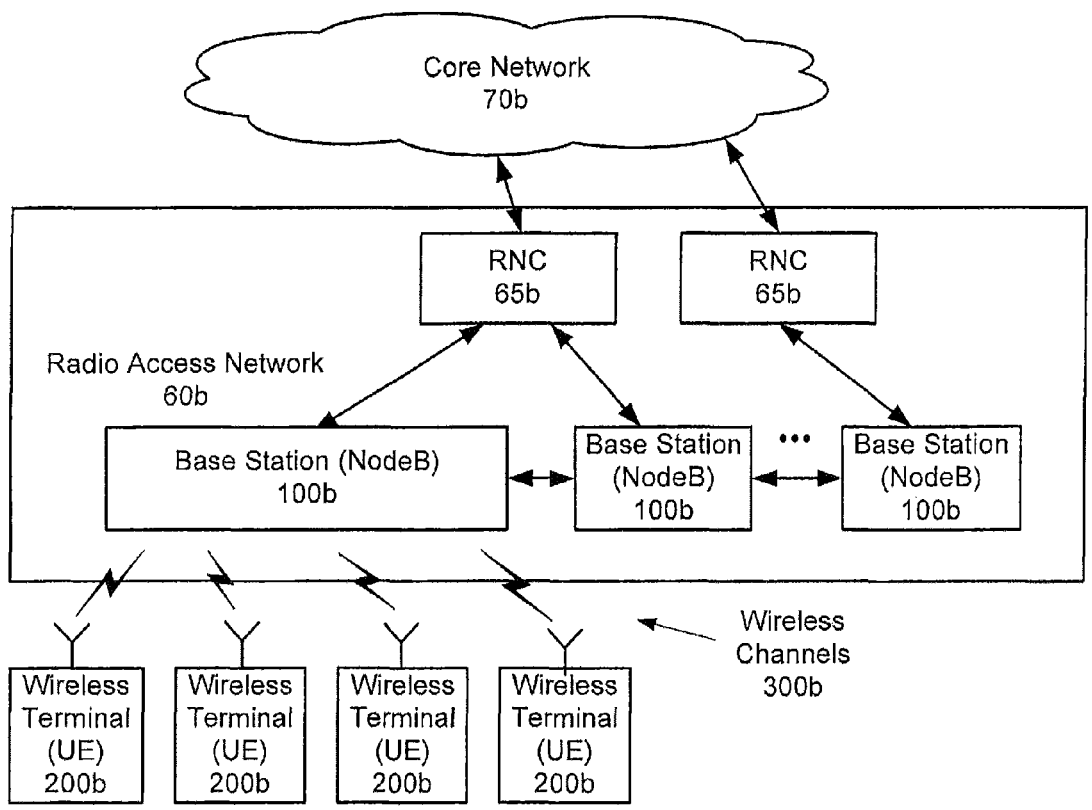

FIG. 1B is a block diagram of a communication system that is configured to operate according to some other embodiments of present inventive concepts. An example RAN 60b is shown that may be a WCDMA RAN. Radio base stations (e.g., NodeBs) 100b may be coupled to core network(s) 70b through one or more radio network controllers (RNCs) 65b. In some embodiments, functionality of a radio network controller(s) may be performed by radio base stations 100b. Radio base stations 100b communicate over wireless channels 300b with wireless terminals (also referred to as user equipment nodes or UEs) 200b that are within their respective communication service cells (also referred to as coverage areas). The radio base stations 100b can communicate with one another and with the core network(s) 70b, as is well known to one who is skilled in the art.

Figure 2:
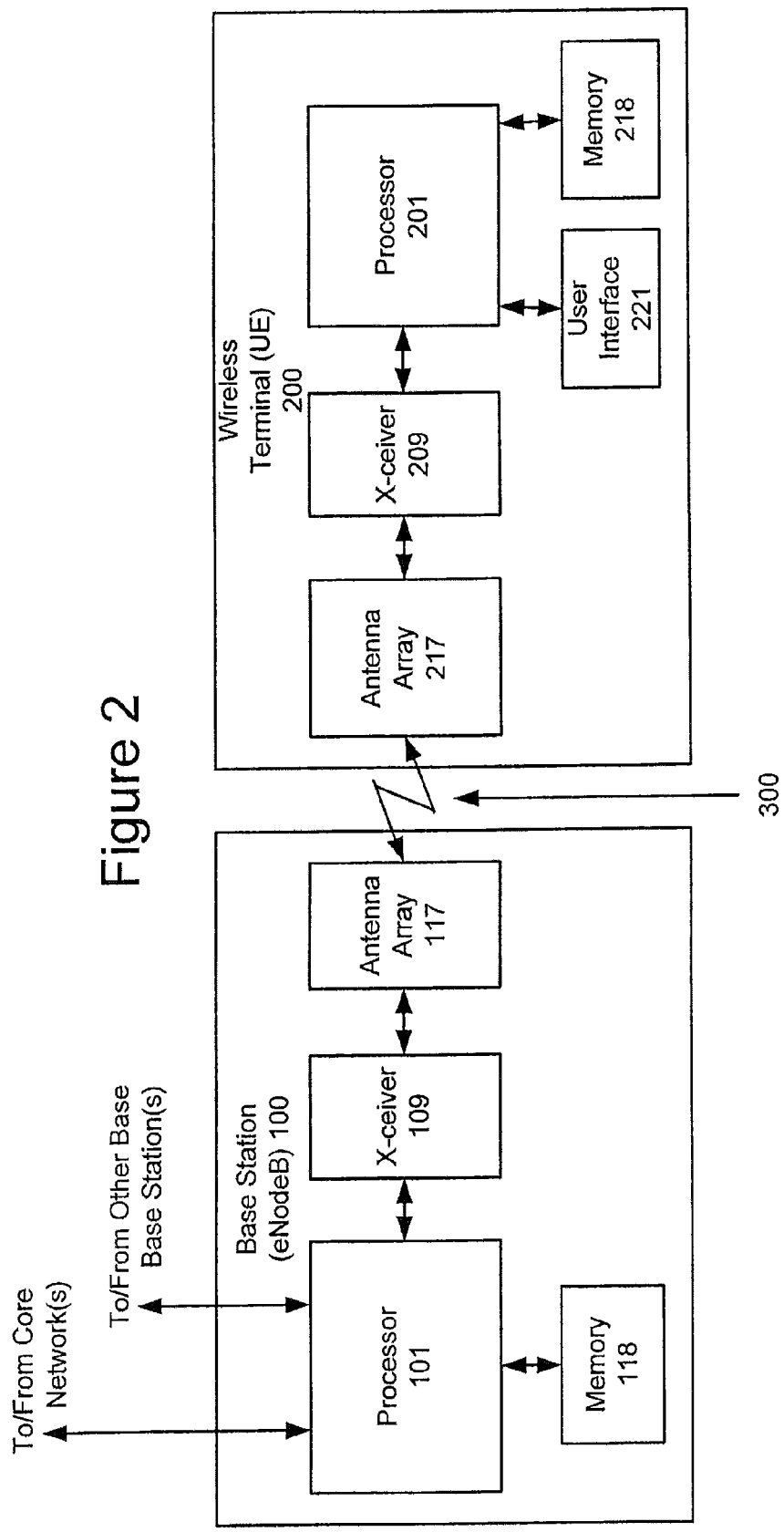
FIG. 2 is a block diagram illustrating a base station and a wireless terminal according to some embodiments of FIGS. 1A and/or 1B.

FIG. 2 is a block diagram of a base station 100 (e.g., base station 100a and/or 100b) and a wireless terminal 200 (e.g., wireless terminal 200a and/or 200b) of FIG. 1A and/or FIG. 1B in communication over wireless channel 300 (e.g., wireless channel 300a and/or 300b) according to some embodiments of present inventive concepts. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209. In the other direction, wireless terminal processor 201 may transmit communications through transceiver 209 and antenna array 217 for reception at base station processor 101 through antenna array 117 and transceiver 109. To support up to 4-branch MIMO (allowing parallel transmission of 4 layers/streams of data using a same TFRE), each of antenna arrays 117 and 217 may include four (or more) antenna elements. Wireless terminal 200 of FIG. 2, for example, may be a cellular radiotelephone, a smart phone, a laptop/netbook/tablet/handheld computer, or any other device providing wireless communications. User interface 211, for example, may include a visual display such as an liquid crystal display, a touch sensitive visual display, a keypad, a speaker, a microphone, etc. As used herein, the term time-frequency-resource-element (TFRE) may refer to a time-frequency-code-resource-element.

For MIMO downlink transmissions from RAN 60 to wireless terminal 200, a codebook of precoding vectors (known at both RAN 60 and wireless terminal 200) is used to precode (e.g., to apply precoding weights to) the different data layers (data streams) that are transmitted in parallel from a sector antenna array(s) to the wireless terminal 200 during a same TFRE, and to decode the data layers (data streams) received in parallel during the same TFRE at wireless terminal 200. The same codebook of precoding vectors may be stored in wireless terminal memory 218 and in base station memory 118. Moreover, wireless terminal 200 may estimate characteristics of each downlink channel to generate channel quality information (CQI), and CQI feedback from wireless terminal 200 may be transmitted to base station 100. This CQI feedback may then be used by the base station processor 101 to select: transmission rank (i.e., a number of data layers/streams to be transmitted during a subsequent TFRE); transport data block length(s); channel code rate(s) to be used to channel encode different transport data blocks; modulation order(s); symbol to layer mapping schemes; and/or precoding vectors for respective downlink transmissions to the wireless terminal 200.

By way of example, base station antenna array 117 may include 4 antennas and wireless terminal antenna array 217 may include four antennas so that wireless terminal 200 may receive up to four downlink data layers (data streams) from base station antenna array 117 during MIMO communications. In this example, the precoding codebook may include rank 1 precoding vectors (used when transmitting one downlink data stream from a base station sector antenna array 117 to wireless terminal 200), rank 2 precoding vectors (used when transmitting two downlink data streams from a base station sector antenna array 117 to wireless terminal 200), rank 3 precoding vectors (used when transmitting three downlink data streams from a base station sector antenna array 117 to wireless terminal 200), and rank 4 precoding vectors (used when transmitting four downlink data streams from a base station sector antenna array 117 to wireless terminal 200). Precoding vectors may also be referred to, for example, as precoding codebook entries, precoding codewords, and/or precoding matrices.

An issue for four layer MIMO transmission schemes for HSDPA is what number of HARQ (Hybrid Automatic Repeat Request) codewords/processes should be supported. To reduce uplink and/or downlink signaling, two HARQ codewords/processes may be used in four layer MIMO transmission schemes for feedback relating to one, two, three, and four layer downlink transmissions. Use of two HARQ codewords/processes may be relatively easier to implement without significantly reducing performance (relative to use of four HARQ codewords/processes).

As discussed in greater detail below, a wireless terminal 200 implementing HARQ functionality may include a soft buffer for each transport data block received during a TFRE. More particularly, a single soft buffer may be used for layer/rank one MIMO transmission/reception (with one transport data block received during a TFRE), two soft buffers may be used for layer/rank two MIMO transmission/reception (with two transport data blocks received during a TFRE), three soft buffers may be used for layer/rank three MIMO transmission/reception (with three transport data blocks received during a TFRE), and four soft buffers may be used for layer/rank four MIMO transmission/reception (with four transport data blocks received during a TFRE). Each soft buffer stores a demodulator output for a transport data block before decoding to be used after a retransmission if the transport data block is not successfully decoded. For Release 7 MIMO supporting up to two rank/layer transmissions (with up to two transport data blocks transmitted to a UE during a TFRE), a HARQ process is provided for each soft buffer and thus for each transport data block. When two HARQ processes are mapped to three or four layer/rank MIMO transmission/reception, however, a mechanism to map UE receiver soft buffers to HARQ processes may be needed.

According to some embodiments discussed herein, methods of mapping functionalities between UE receiver soft buffers and HARQ processes for situations when the number of supported HARQ processes is less than a number of MIMO transmission layers/ranks supported by the system (e.g., when rank/layer 3 and/or 4 MIMO transmissions are supported but only two HARQ processes are supported). With two HARQ processes, both HARQ ACK/NACK messages may be included in a HARQ codeword of the feedback channel (e.g., HS-DPCCH).

Figure 3A:
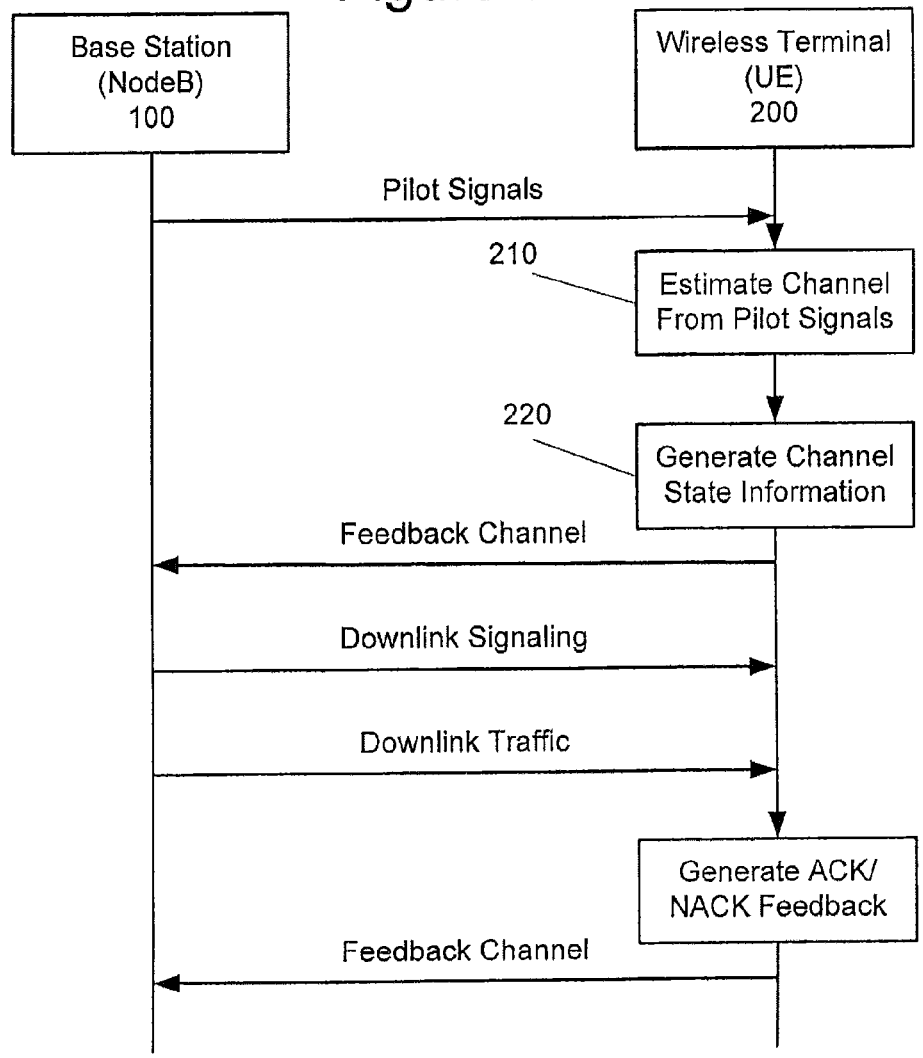
FIG. 3A is a message sequence chart for a MIMO communication system.
Figure 3B:
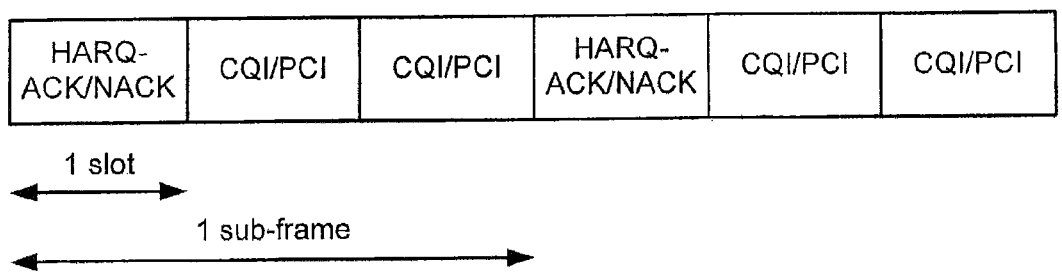
FIG. 3B is illustrates a feedback channel report format of FIG. 3A.

FIG. 3A illustrates a message sequence between base station 100 and wireless terminal 200 in a MIMO communications system. As shown in FIG. 3A, base station 100 transmits pilot signals over the downlink channel(s), and wireless terminal 200 estimates the downlink channel(s) (for transmissions from base station 100 to wireless terminal 200) based on the pilot signals. Wireless terminal 200 generates (e.g., computes) channel state information for the downlink channel(s), and wireless terminal 200 reports the channel state information to base station 100 over a feedback channel. An example of a format for a feedback channel report for two reporting intervals is illustrated in FIG. 3B, and FIG. 3B shows that the feedback channel report may include a HARQ element/message/codeword (including acknowledge/ACK and/or negative-acknowledge/NACK information to be included in a HARQ codeword) and/or CQI/PCI (channel quality information and/or precoding control indicator) information.

Figure 4:
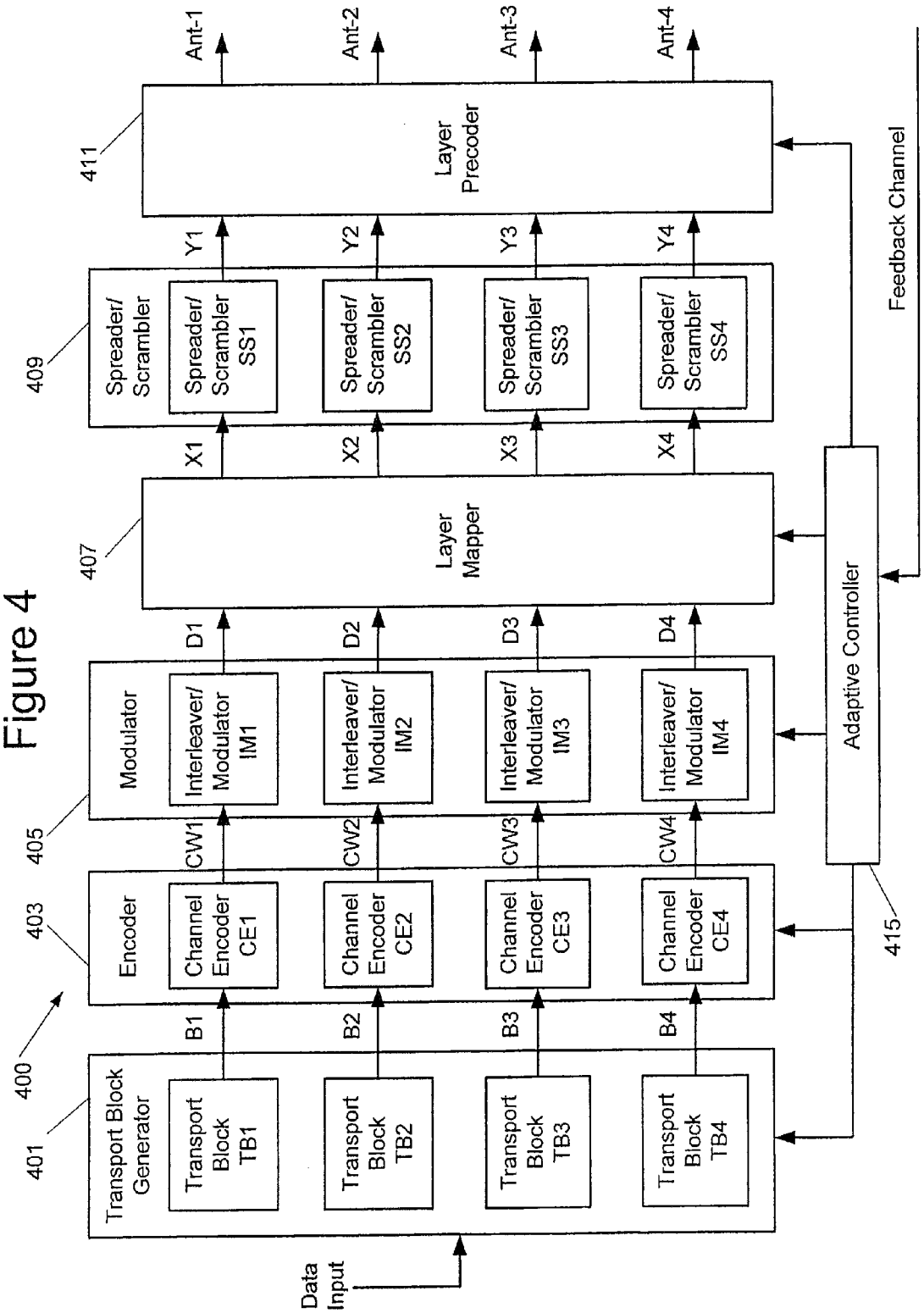
FIG. 4 is a block diagram illustrating elements/functionalities of base station processors according to some embodiments of FIG. 2.

FIG. 4 is block diagram illustrating elements/functionalities of base station processor 101 of FIG. 2 supporting two HARQ process/codeword MIMO with 4 channel encoders and up to four layer/rank MIMO downlink transmission according to some embodiments. According to embodiments of FIG. 4, four channel encoders CE1, CE2, CE3, and CE4 may be provided for four streams of transport data blocks B1, B2, B3, and B4, with symbols of the four data streams being mapped to as many as four different data streams. As shown, processor 101 may include transport data block generator 401, channel encoder 403, modulator 405, layer mapper 407, spreader/scrambler 409, and layer precoder 411. In embodiments of FIG. 4, channel encoder 403 may include channel encoders CE1, CE2, CE3, and CE4 for the four streams of transport data blocks B1, B2, B3, and B4, modulator 405 may include interleavers/modulators IM1, IM2, IM3, and IM4, and layer mapper 407 may be configured to map resulting symbols of the four streams to as many as four different MIMO layers (streams) X1, X2, X3, and X4 as discussed in greater detail below. Moreover, adaptive controller 415 may be configured to control transport data block generator 401, channel encoder 403, modulator 405, layer mapper 407, and/or layer precoder 411 responsive to channel quality information (CQI) received as feedback from wireless terminal 200.

Accordingly, symbols generated responsive to data codewords respectively generated by channel encoders CE1, CE2, CE3, and CE4 using different channel coding (determined by adaptive controller 415 responsive to wireless terminal 200 feedback) may be interleaved and distributed (mapped) to 4 different MIMO layers. More particularly, symbols generated responsive to two data codewords (where a data codeword CW is a transport data block with additional channel coding and/or CRC bits) may be interleaved and then split between two different MIMO layers. According to some embodiments discussed herein, layer mapper 407 may perform a one-to-one mapping.

Base station processor 101, for example, may receive input data (e.g., from core network 70, from another base station, etc.) for transmission to wireless terminal 200, and transport data block generator 401 (including transport data block data generators TB1, TB2, TB3, and TB4) may provide a single stream of data blocks (for rank 1 transmissions) or separate the input data into a plurality of different streams of data blocks (for rank 2, rank 3, and rank 4 transmission). More particularly, for rank 1 transmissions (providing only 1 MIMO layer/stream), all input data may be processed through transport data block generator TB1 to provide a single stream of transport data blocks B1 (including individual transport data blocks b1-1, b1-2, b1-3, etc.) without using transport data block generators TB2, TB3, or TB4 and without generating other streams of transport data blocks B2, B3, or B4. For rank 2 transmissions (providing 2 MIMO layers/streams), transport data block generator TB1 may generate a stream of transport data blocks B1 (including individual transport data blocks b1-1, b1-2, b1-3, etc.), and transport data block generator TB2 may generate a stream of transport data blocks B2 (including individual transport data blocks b2-1, b2-2, b2-3, etc.) without using transport data block generators TB3 or TB4 and without generating other streams of transport data blocks B3 or B4. For rank 3 transmissions (providing 3 MIMO layers/streams), transport data block generator TB1 may generate a stream of transport data blocks B1 (including individual transport data blocks b1-1, b1-2, b1-3, etc.), transport data block generator TB2 may generate a stream of transport data blocks B2 (including individual transport data blocks b2-1, b2-2, b2-3, etc.), and transport data block generator TB3 may generate a stream of transport data blocks B3 (including individual transport data blocks b3-1, b3-2, b3-3, etc.), without using transport data block generator TB4 and without generating another stream of transport data blocks B4. For rank 4 transmissions (providing 4 MIMO layers/streams), transport data block generator TB1 may generate a stream of transport data blocks B1 (including individual transport data blocks b1-1, b1-2, b1-3, etc.), transport data block generator TB2 may generate a stream of transport data blocks B2 (including individual transport data blocks b2-1, b2-2, b2-3, etc.), transport data block generator TB3 may generate a stream of transport data blocks B3 (including individual transport data blocks b3-1, b3-2, b3-3, etc.), and transport data block generator TB4 may generate a stream of transport data blocks B4 (including individual transport data blocks b4-1, b4-2, b4-3, etc.).

Channel encoder 403 (including channel encoders CE1, CE2, CE3, and CE4) may encode the stream/streams of data blocks B1, B2, B3, and/or B4 generated by transport data block generator 401 to provide respective streams of data codewords CW1 (including individual data codewords cw1-1, cw1-2, cw1-3, etc.), CW2 (including individual data codewords cw2-1, cw2-2, cw2-3, etc.), CW3 (including individual data codewords cw3-1, cw3-2, cw3-3, etc.), and/or CW4 (including individual data codewords cw4-1, cw4-2, cw4-3, etc.), for example, using turbo coding, convolutional coding, etc. Moreover, coding characteristics (e.g., coding rates) applied by channel encoders CE1, CE2, CE3, and CE4 may be separately determined by adaptive controller 415 responsive to wireless terminal 200 feedback (e.g., CQI regarding the downlink channel). For rank 1 transmissions, channel encoder 403 may generate a single stream of data codewords CW1 responsive to the stream of data blocks B1 using only channel encoder CE1. For rank 2 transmissions, channel encoder 403 may generate two streams of data codewords CW1 and CW2 responsive to respective streams of data blocks B1 and B2 using channel encoder CE1 and channel encoder CE2. For rank 3 transmissions, channel encoder 403 may generate three streams of data codewords CW1, CW2, and CW3 responsive to respective streams of data blocks B1, B2, and B3 using channel encoder CE1, channel encoder CE2, and channel encoder CE3. For rank 4 transmissions, channel encoder 403 may generate four streams of data codewords CW1, CW2, CW3, and CW4 responsive to respective streams of data blocks B1, B2, B3, and B4 using channel encoder CE1, channel encoder CE2, channel encoder CE3, and channel encoder CW4. According to some embodiments, channel encoders CE1, CE2, CE3, and/or CE4 may apply different coding characteristics (e.g., different coding rates) during rank 2, rank 3, and/or rank 4 transmissions to generate respective (differently coded) data codewords cw1-1, cw2-1, cw3-1, and/or cw4-1 including data to be transmitted during a same TFRE.

Modulator 405 (including interleaver/modulators IM1, IM2, IM3, and IM4) may interleave and modulate the stream/streams of data codewords CW1, CW2, CW3, and/or CW4 generated by channel encoder 403 to provide respective streams of unmapped symbol blocks D1 (including unmapped symbol blocks d1-1, d1-2, d1-3, etc.), D2 (including unmapped symbol blocks d2-1, d2-2, d2-3, etc.), D3 (including unmapped symbol blocks d3-1, d3-2, d3-3, etc.), and/or D4 (including unmapped symbol blocks d4-1, d4-2, d4-3, etc.). For rank 1 transmissions (providing only 1 MIMO layer/stream), modulator 405 may generate a single stream of unmapped symbol blocks D1 responsive to the stream of data codewords CW1 using only interleaver/modulator IM1. For rank 2 transmissions, modulator 405 may generate two streams of unmapped symbol blocks D1 and D2 responsive to respective streams of data codewords CW1 and CW2 using interleaver/modulators IM1 and IM2. For rank 3 transmissions, modulator 405 may generate three streams of unmapped symbol blocks D1, D2, and D3 responsive to respective streams of data codewords CW1, CW2, and CW3 using interleaver/modulators IM1, IM2, and IM3. For rank 4 transmissions, modulator 405 may generate four streams of unmapped symbol blocks D1, D2, D3, and D4 responsive to respective streams of data codewords CW1, CW2, CW3, and CW4 using interleaver/modulators IM1, IM2, IM3, and IM4. Modulator 405 may apply modulation orders responsive to input from adaptive controller 315 determined based on CQI feedback from wireless terminal 200.

In addition, each interleaver/modulator IM1, IM2, IM3, and/or IM4 may interleave data of two or more data codewords of a stream so that two or more consecutive unmapped symbol blocks of a respective stream include symbols representing data of the two or more consecutive data codewords. For example, data of consecutive data codewords cw1-1 and cw1-2 of data codeword stream CW1 may be interleaved and modulated to provide consecutive unmapped symbol blocks d1-1 and d1-2 of stream D1. Similarly, data of consecutive data codewords cw2-1 and cw2-2 of data codeword stream CW2 may be interleaved and modulated to provide consecutive unmapped symbol blocks d2-1 and d2-2 of stream D2; data of consecutive data codewords cw3-1 and cw3-2 of data codeword stream CW3 may be interleaved and modulated to provide consecutive unmapped symbol blocks d3-1 and d3-2 of stream D3; and/or data of consecutive data codewords cw4-1 and cw4-2 of data codeword stream CW4 may be interleaved and modulated to provide consecutive unmapped symbol blocks d4-1 and d4-2 of stream D4.

Symbols of streams of unmapped symbol blocks D1, D2, D3, and D4 may be mapped to respective streams of mapped symbol blocks X1, X2, X3, and X4 (for respective MIMO transmission layers), for example, using a one-to-one mapping. While one-to-one mapping is discussed by way of example, other mappings may be used provided that the mapping function of layer mapper 407 is known to both base station 100 and wireless terminal 200.

Spreader/scrambler 409 may include four spreader/scramblers SS1, SS2, SS3, and SS4, and for each mapped symbol stream provided by layer mapper 407, spreader/scrambler 409 may generate a respective stream of spread symbol blocks Y1, Y2, Y3, and Y4 (e.g., using a Walsh code). Layer precoder 411 may apply a MIMO precoding vector (e.g., by applying precoding weights) of the appropriate rank (based on wireless terminal feedback as interpreted by adaptive controller 415) to the streams of spread symbol blocks for transmission through transceiver 109 and antennas Ant-1, Ant-2, Ant-3, and Ant-4 of antenna array 117. With rank/layer one transmissions, only first elements (e.g., TB1, CE1, IM1, and SS1) of FIG. 4 may be used; with rank/layer two transmissions, two elements (e.g., TB1-2, CE1-2, IM1-2, and SS1-2) of FIG. 4 may be used; with rank/layer three transmissions, three elements (e.g., TB1-3, CE1-3, IM1-3, and SS1-3) of FIG. 4 may be used; and with rank/layer four transmissions, four elements (e.g., TB1-4, CE1-4, IM1-4, and SS1-4) of FIG. 4 may be used.

In embodiments of FIG. 4, base station processor 101 may support two HARQ processes MIMO with 4 channel encoders CE1-CE4. Using feedback from wireless terminal 200 (indicated by "feedback channel"), adaptive controller 415 chooses transport block length, modulation order, and coding rate. Adaptive controller 415 also generates precoding weight information used by layer precoder 411. Even though encoder 403 includes four channel encoders CE1-CE4, wireless terminal 200 may only provide feedback information for a maximum of two encoded transport data block codewords. Stated in other words, wireless terminal 200 may provide one HARQ codeword for layer one transmissions, wireless terminal 200 may provide two HARQ codewords for layer two transmissions, wireless terminal 200 may provide two HARQ codewords for layer three transmissions, and wireless terminal 200 may provide two HARQ codewords for layer four transmissions.

For rank three and rank four transmissions, a number of data streams generated by transport block generator 401, encoder 403, modulator 405, and spreader scrambler 409 is greater than a number of HARQ processes provided by wireless terminal 200. According to embodiments of present inventive concepts discussed herein, a HARQ process may be mapped to more than one data stream for rank 3 and rank for transmissions. For rank one transmissions, for example, one HARQ process may be mapped directly to one data stream (e.g., generated using TB1, CE1, IM1, and/or SS1). For rank two transmission, a first HARQ process may be mapped directly to a first data stream (e.g., generated using TB1, CE1, IM1, and/or SS1), and a second HARQ process may be mapped directly to a second data stream (e.g., generated using TB2, CE2, IM2, and/or SS2). For rank three transmission, a first HARQ process may be mapped to a first data stream (e.g., generated using TB1, CE1, IM1, and/or SS1) and to a second data stream (e.g., generated using TB2, CE2, IM2, and/or SS2), and a second HARQ process may be mapped to a third data stream (e.g., generated using TB3, CE3, IM3, and/or SS3). For rank four transmission, a first HARQ process may be mapped to a first data stream (e.g., generated using TB1, CE1, IM1, and/or SS1) and to a second data stream (e.g., generated using TB2, CE2, IM2, and/or SS2), and a second HARQ process may be mapped to a third data stream (e.g., generated using TB3, CE3, IM3, and/or SS3) and to a fourth data stream (e.g., generated using TB4, CE4, IM4, and/or SS4).

According to some other embodiments, one HARQ process may be mapped directly to one data stream (e.g., generated using TB1, CE1, IM1, and/or SS1) for rank one transmissions. For rank two transmission, a first HARQ codeword/process/identification may be mapped directly to a first data stream (e.g., generated using TB1, CE1, IM1, and/or SS1), and a second HARQ process may be mapped directly to a second data stream (e.g., generated using TB2, CE2, IM2, and/or SS2). For rank three transmission, a first HARQ process may be mapped to a first data stream (e.g., generated using TB1, CE1, IM1, and/or SS1), and a second HARQ process may be mapped to a second data stream (e.g., generated using TB2, CE2, IM2, and/or SS2) and to a third data stream (e.g., generated using TB3, CE3, IM3, and/or SS3). For rank four transmission, a first HARQ process may be mapped to a first data stream (e.g., generated using TB1, CE1, IM1, and/or SS1) and to a fourth data stream (e.g., generated using TB4, CE4, IM4, and/or SS4), and a second HARQ process may be mapped to a second data stream (e.g., generated using TB2, CE2, IM2, and/or SS2) and to a third data stream (e.g., generated using TB3, CE3, IM3, and/or SS3).

Based on the rank chosen by adaptive controller 415, transport data blocks may be passed to encoder 403, and encoder outputs may be interleaved and modulated using modulator 405. Outputs of modulator 405 may be mapped to space time layers using layer mapper 407, and as discussed above, layer mapper 407 may provide a one-to-one layer mapping. The symbol stream(s) generated by layer mapper 407 may be spread and scrambled using spreader/scrambler 409, and layer precoder 411 may precode outputs of spreader/scrambler 409, with precoder outputs being passed through transceiver 109 and antenna array 117 (including Antennas Ant-1, Ant-2, Ant-3, and Ant-4).

Figure 5:
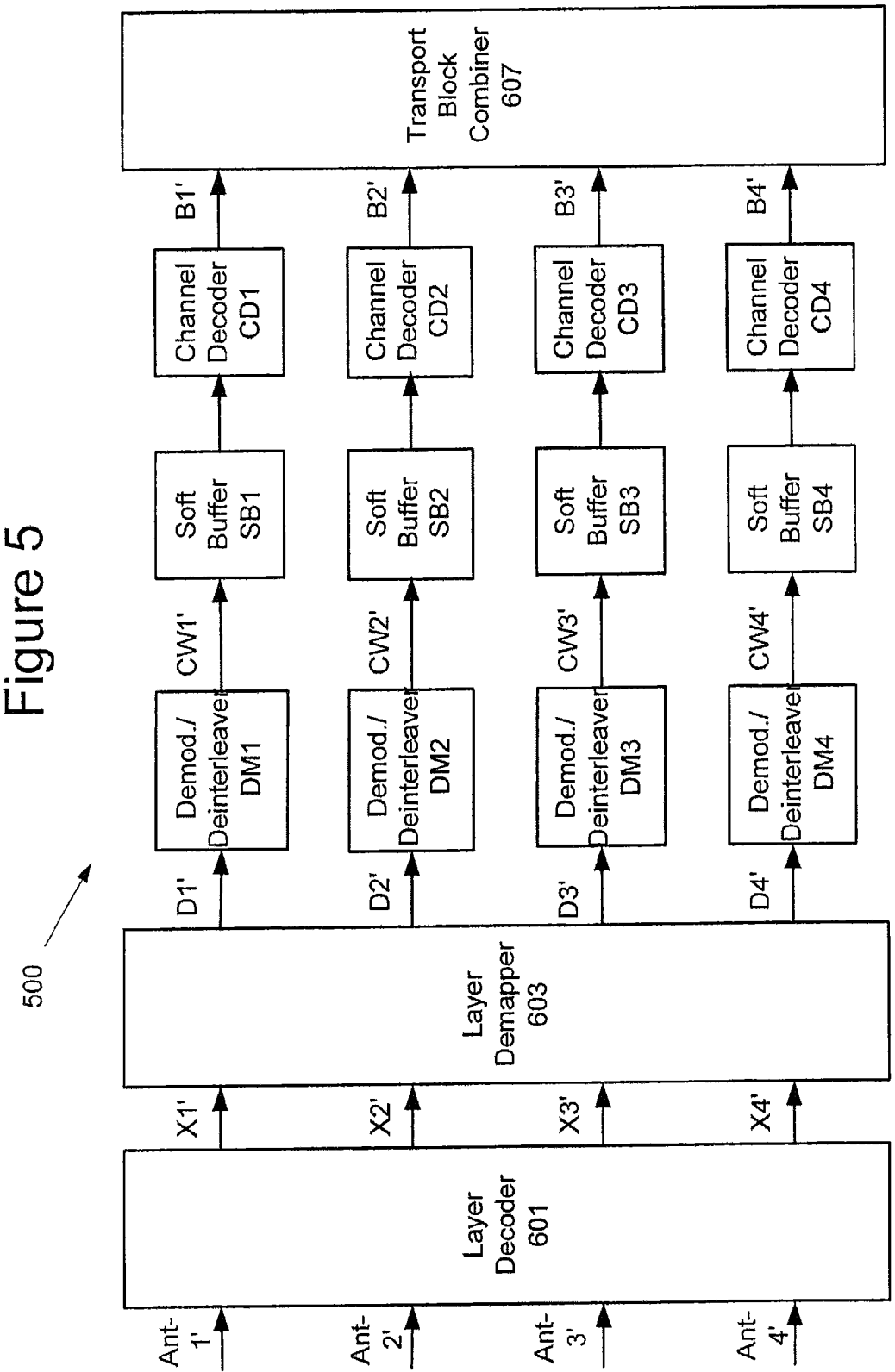
FIG. 5 is a block diagram illustrating elements/functionalities of wireless terminal processors according to some embodiments of FIG. 2.

At wireless terminal 200, operations of processor 201 may mirror operations of base station processor 101 when receiving the MIMO downlink communications transmitted by the base station. More particularly, elements/functionalities of wireless terminal processor 201 are illustrated in FIG. 5 mirroring elements/functionalities of base station processor 101 discussed above with reference to FIG. 4.

Radio signals may be received through MIMO antenna elements of MIMO antenna array 217 and transceiver 209, and the radio signals may be decoded by layer decoder 601 using a MIMO decoding vector to generate a plurality of MIMO decoded symbol layers X1', X2', X3', and/or X4' depending on MIMO rank used for transmission/reception. Layer Decoder 601 may use a decoding vector corresponding to the precoding vector used by base station 100. Layer decoder 601 may generate a single decoded symbol layer X1' for rank 1 reception, layer decoder 601 may generate two decoded symbol layers X1' and X2' for rank 2 reception, layer decoder 601 may generate three decoded symbol layers X1', X2', and X3' for rank 3 reception, and layer decoder 601 may generate four decoded symbol layers X1', X2', X3', and X4' for rank 4 transmission. Layer decoder 601 may thus perform a converse of operations performed by layer precoder 411 and spreader/scrambler 409 of base station 100. Layer decoder 601 may perform functionalities of a MIMO detector (corresponding to a converse of layer precoder 411) and of dispreading/descrambling blocks for each data stream/layer (corresponding to a converse of spreader/scrambler 409). Layer demapper 603 may function as a converse of layer mapper 407 to demap decoded symbol layers X1', X2', X3', and/or X4' to respective unmapped symbol layers D1', D2', D3', and/or D4' according to the transmission rank.

For rank one reception, layer demapper 603 may demap symbols of decoded symbol layer X1' blocks x1'-$j$ directly to symbols of unmapped symbol layer D1' blocks d1'-$j$, demodulator/deinterleaver DM-1 may demodulate/deinterleave unmapped symbol layer blocks d1'-$j$ to provide data codewords cw1'-$j$ of data codeword stream CW1', and channel decoder CD1 may decode data codewords cw1'-$j$ of data codeword stream CW1' to provide transport blocks b1'-$j$ of stream B1'. Transport block generator 607 may then pass transport blocks b1'-$j$ of stream B1' as a data stream. During rank one reception, demodulators/deinterleavers DM2, DM3, and DM4 and channel decoders CD2, CD3, and CD4 may be unused.

For rank two reception, layer decoder 601 may generate decoded symbol layers X1' and X2'. Layer demapper 603 may demap symbols of decoded symbol layer X1' blocks x1'-$j$ directly to symbols of unmapped symbol layer D1' blocks d1'-$j$, and layer demapper 603 may demap symbols of decoded symbol layer X2' blocks x2'-$j$ directly to symbols of unmapped symbol layer D2' blocks d2'-$j$. Demodulator/deinterleaver DM-1 may demodulate/deinterleave unmapped symbol layer blocks d1'-$j$ to provide data codewords cw1'-$j$ of data codeword stream CW1', and demodulator/deinterleaver DM-2 may demodulate/deinterleave unmapped symbol layer blocks d2'-$j$ to provide data codewords cw2'-$j$ of data codeword stream CW2'. Channel decoder CD1 may decode data codewords cw1'-$j$ of data codeword stream CW1' to provide transport blocks b1'-$j$ of stream B1', and channel decoder CD2 may decode data codewords cw2'-$j$ of data codeword stream CW2' to provide transport blocks b1'-$j$ of stream B2'. Transport block generator 607 may then combine transport blocks b1'-$j$ and b2'-$j$ of streams B1' and B2' as a data stream. During rank two reception, demodulators/deinterleavers DM3 and DM4 and channel decoders CD3 and CD4 may be unused.

For rank three reception, layer decoder 601 may generate decoded symbol layers X1', X2', and X3'. Layer demapper 603 may demap symbols of decoded symbol layer X1' blocks x1'-$j$ directly to symbols of unmapped symbol layer D1' blocks d1'-$j$, layer demapper 603 may demap symbols of decoded symbol layer X2' blocks x2'-$j$ directly to symbols of unmapped symbol layer D2' blocks d2'-$j$, and layer demapper 603 may demap symbols of decoded symbol layer X3' blocks x3'-$j$ directly to symbols of unmapped symbol layer D3' blocks d3'-$j$. Demodulator/deinterleaver DM-1 may demodulate/deinterleave unmapped symbol layer blocks d1'-$j$ to provide data codewords cw1'-$j$ of data codeword stream CW1', demodulator/deinterleaver DM-2 may demodulate/deinterleave unmapped symbol layer blocks d2'-$j$ to provide data codewords cw2'-$j$ of data codeword stream CW2', and demodulator/deinterleaver DM-3 may demodulate/deinterleave unmapped symbol layer blocks d3'-$j$ to provide data codewords cw3'-$j$ of data codeword stream CW3'. Channel decoder CD1 may decode data codewords cw1'-$j$ of data codeword stream CW1' to provide transport blocks b1'-$j$ of stream B1', channel decoder CD2 may decode data codewords cw2'-*j* of data codeword stream CW2' to provide transport blocks b2'-*j* of stream B2', and channel decoder CD3 may decode data codewords cw3'-*j* of data codeword stream CW3' to provide transport blocks b3'-*j* of stream B3'. Transport block generator 607 may then combine transport blocks b1'-*j*, b2'-*j*, and b3'-*j* of streams B1', B2', and B3' as a data stream. During rank three reception, demodulator/deinterleaver DM4 and channel decoder CD4 may be unused.

For rank four reception, layer decoder 601 may generate decoded symbol layers X1', X2', X3', X4'. Layer demapper 603 may demap symbols of decoded symbol layer X1' blocks x1'-*j* directly to symbols of unmapped symbol layer D1' blocks d1' j, layer demapper 603 may demap symbols of decoded symbol layer X2' blocks x2'-*j* directly to symbols of unmapped symbol layer D2' blocks d2'-*j*, and layer demapper 603 may demap symbols of decoded symbol layer X3' blocks x3'-*j* directly to symbols of unmapped symbol layer D3' blocks d3'-*j*, and layer demapper 603 may demap symbols of decoded symbol layer X4' blocks x4'-*j* directly to symbols of unmapped symbol layer D4' blocks d4'-*j*. Demodulator/deinterleaver DM-1 may demodulate/deinterleave unmapped symbol layer blocks d1'-*j* to provide data codewords cw1'-*j* of data codeword stream CW1', demodulator/deinterleaver DM-2 may demodulate/deinterleave unmapped symbol layer blocks d2'-*j* to provide data codewords cw2'-*j* of data codeword stream CW2', demodulator/deinterleaver DM-3 may demodulate/deinterleave unmapped symbol layer blocks d3'-*j* to provide data codewords cw3'-*j* of data codeword stream CW3', and demodulator/deinterleaver DM-4 may demodulate/deinterleave unmapped symbol layer blocks d4'-*j* to provide data codewords cw4'-*j* of data codeword stream CW4'. Channel decoder CD1 may decode data codewords cw1'-*j* of data codeword stream CW1' to provide transport blocks b1'-*j* of stream B1', channel decoder CD2 may decode data codewords cw2'-*j* of data codeword stream CW2' to provide transport blocks b2'-*j* of stream B2', channel decoder CD3 may decode data codewords cw3'-*j* of data codeword stream CW3' to provide transport blocks b3'-*j* of stream B3', and channel decoder CD4 may decode data codewords cw4'-*j* of data codeword stream CW4' to provide transport blocks b4'-*j* of stream B4'. Transport block generator 607 may then combine transport blocks b1'-*j*, b2' j, b3'-*j*, and b4'-*j* of streams B1', B2', B3', and B4' as a data stream.

As further shown in FIG. 5, a respective soft buffer SB1, SB2, SB3, and SB4 may be provided for each stream of received data, and each decoder CD1, CD2, CD3, and CD4 may be configured to determine whether each decoded transport data block passes or fails decoding. In greater detail, each undecoded transport data block generated by a demodulator/decoder DM may be saved in the respective soft buffer SB until a decoding result is determined by the channel decoder CD. If the transport data block passes decoding, an ACK (acknowledge message) may be generated and provided as feedback for the base station, and retransmission is not required. If the transport data block does not pass decoding, a NACK (negative acknowledge message) may be generated and provided as feedback for the base station, and the undecoded output of the demodulator/deinterleaver (also referred to as soft bits) may be saved in soft buffer SB. Responsive to the NACK, the base station may retransmit the failed transport data block, and wireless terminal 200 may use the retransmitted data block together with the previously undecoded output of the demodulator/deinterleaver that is saved in the soft buffer to decode the retransmitted data block on the second pass. By using the soft buffer to combine first and second versions of the demodulated data block, a likelihood of successful decoding may be increased after retransmission.

As shown in FIG. 5, layer decoder 601 (e.g., including a MIMO detector such as a minimum mean squared error or MMSE receiver), may reduce interference from the multipath channel and/or may reduce other antenna interference. After dispreading, demapping, demodulating, and/or deinterleaving, wireless terminal 200 may attempt to decode the coded bits of a transport data block using a respective channel decoder. If the decoding attempt fails, wireless terminal buffers the received soft bits of the transport data block in the respective soft buffer, and requests retransmission of the transport data block by transmitting a NACK message (e.g., as a part of an HARQ-ACK codeword). Once the retransmission is received (and subjected to decoding, demapping, demodulating, and/or deinterleading) by wireless terminal 200, wireless terminal may combine the buffered soft bits with the received soft bits from the retransmission and attempt to decode the combination using a respective channel decoder.

For soft combining to operate properly, the wireless terminal may need to know whether a received transmission is a new transmission of a transport data block or a retransmission of a previously transmitted transport data block. For this purpose, the downlink control signaling may include a data indicator (also referred to as an indicator, a new data indicator, a new/old data indicator, etc.) that is used by the wireless terminal to control whether the soft buffer should be cleared or whether soft combining of the soft buffer and the received soft bits should take place. For a given transmission/retransmission to wireless terminal 200, the data indicator may thus have one value to indicate an initial transmission of new data and another value to indicate a retransmission of previously transmitted data.

Whenever a current transmission is not a retransmission, a NodeB base station MAC-ehs element of base station processor 101 may increment a single bit data indicator (also referred to as an indicator or a new data indicator). Accordingly, the single bit data indicator may be toggled each time a new transport data block is transmitted over a MIMO layer. The data indicator can thus be used by wireless terminal processor 201 to clear the soft buffer/buffers for each initial transmission because no soft combining should be done for new/initial transmissions. The indicator may also be used to detect error cases in the status signaling. If the data indicator in not toggled despite the fact that the previous data for the HARQ process in question was correctly decoded and acknowledged (using an ACK message), for example, an error in the uplink signaling has most likely occurred. Similarly, if the indicator is toggled but the previous data for the HARQ process was not correctly decoded, the wireless terminal may replace the data previously in the soft buffer for the HARQ process with the new received data.

For rank four transmissions, wireless terminal 200 may thus receive up to four transport data blocks in a same TFRE. After decoding for the TFRE during a rank 4 transmission, each decoder CD1, CD2, CD3, and CD4 may generate a respective local ACK or NACK depending on whether the respective transport data block passed or failed decoding. For rank three transmissions, wireless terminal 200 may thus receive up to three transport data blocks in a same TFRE. After decoding for the TFRE during a rank 3 transmission, each decoder CD1, CD2, and CD3 may generate a respective local ACK or NACK depending on whether the respective transport data block passed or failed decoding. For rank two transmissions, wireless terminal 200 may thus receive up to two transport data blocks in a same TFRE. After decoding for the TFRE during a rank 2 transmission, each decoder CD1 and CD2 may generate a respective local ACK or NACK depending on whether the respective transport data block passed or failed decoding. For rank one transmissions, wireless terminal 200 may thus receive one transport data block in a TFRE. After decoding for the TFRE during a rank 1 transmission, decoder CD1 may generate a respective local ACK or NACK depending on whether the transport data block passed or failed decoding.

Wireless terminal processor 201, for example, may define, configure, and/or use one or more of reception layers RL1 (including DM1, SB1, and/or CD1), RL2 (including DM2, SB2, and/or CD2), RL3 (including DM3, SB3, and/or CD3), and/or RL4 (including DM4, SB4, and/or CD4) for a given TTI/TFRE responsive to rank and/or precoding vector information provided from base station 100 via downlink signaling as discussed above with respect to FIG. 3A. For example, a higher MIMO rank (defining a respective higher number of reception layers/streams) may be selected when the wireless terminal detects that the downlink channel has a higher SINR (e.g., when the wireless terminal is relatively close to the base station), and a lower MIMO rank (defining a respective lower number of reception layers/streams) may be selected when the wireless terminal detects that the downlink channel has a lower SINR (e.g., when the wireless terminal is relatively distant from the base station).

While separate transport block generator, encoder, modulator, layer mapper, spreader/scrambler, and layer precoder blocks are illustrated in FIG. 4 by way of example, the blocks of FIG. 4 merely illustrate functionalities/operations of base station processor 101 and/or transceiver 109. Sub-blocks (e.g., transport blocks TB1-TB4 channel encoders CE1-CE4, interleavers/modulators IM1-1M4, and spreader scramblers SS1-SS4) of FIG. 4 further illustrate functionalities/operations of transport block generator, encoder block, modulator block, and spreader/scrambler block supporting transmission layers TL1-TL4. Processor 101, however, may provide/define/configure functionality/operations of only one transmission layer TL1 during rank 1 transmission; processor 101 may provide/define/configure functionality/operations of only two transmission layers TL1 and TL2 during rank 2 transmission; processor 101 may provide/define/configure functionality/operations of only 3 transmission layers TL1, TL2, and TL3 during rank 3 transmission; and functionality/operations of four transmission layers TL1, TL2, TL3, and TL4 may only be provided during rank 4 transmission. When multiple transmission layers are provided/defined/configured, for example, processor 101 may provide/define/configure functionality/operations of multiple transport block sub-blocks, multiple channel decoder sub-blocks, multiple interleaver/modulator sub-blocks, and/or multiple spreader/scrambler sub-blocks to allow parallel processing of data of different transmission layers before transmission during a TTI/TFRE, or processor 101 may provide/define/configure functionality/operations of a single transport block, a single channel encoder, a single interleaver/modulator, and/or a single spreader scrambler to allow serial processing of data of different transmission layers before transmission during a TTI/TFRE.

While separate layer decoder, layer demapper, demodulator/deinterleaver, soft buffer, channel decoder, and transport block combiner blocks/sub-blocks are illustrated in FIG. 5 by way of example, the blocks of FIG. 5 merely illustrate functionalities/operations of wireless terminal processor 201 and/or transceiver 209. For example, sub-blocks (e.g., demodulators/deinterleavers DM1-DM4, soft buffers SB1-SB4, and channel decoders CD1-CD4) of FIG. 5 illustrate functionalities/operations providing reception layers RL1-RL4. Processor 101, however, may provide/define/configure functionality/operations of only one reception layer RL1 during rank 1 reception; processor 101 may provide/define/configure functionality/operations of only two reception layers RL1 and RL2 during rank 2 transmission; processor 101 may provide/define/configure functionality/operations of only 3 reception layers RL1, RL2, and RL3 during rank 3 transmission; and functionality/operations of four reception layers RL1, RL2, RL3, and RL4 may only be provided during rank 4 transmission. When multiple reception layers are provided/defined/configured, for example, processor 101 may provide/define/configure functionality/operations of multiple demodulator/deinterleaver blocks, multiple soft buffer blocks, and/or multiple channel decoder blocks to allow parallel processing of data of different reception layers during a TTI/TFRE, or processor 101 may provide/define/configure functionality/operations of a single demodulator/deinterleaver block, a single soft buffer, and/or a single channel decoder to allow serial processing of data of different reception layers during a TTI/TFRE.

Figure 6:
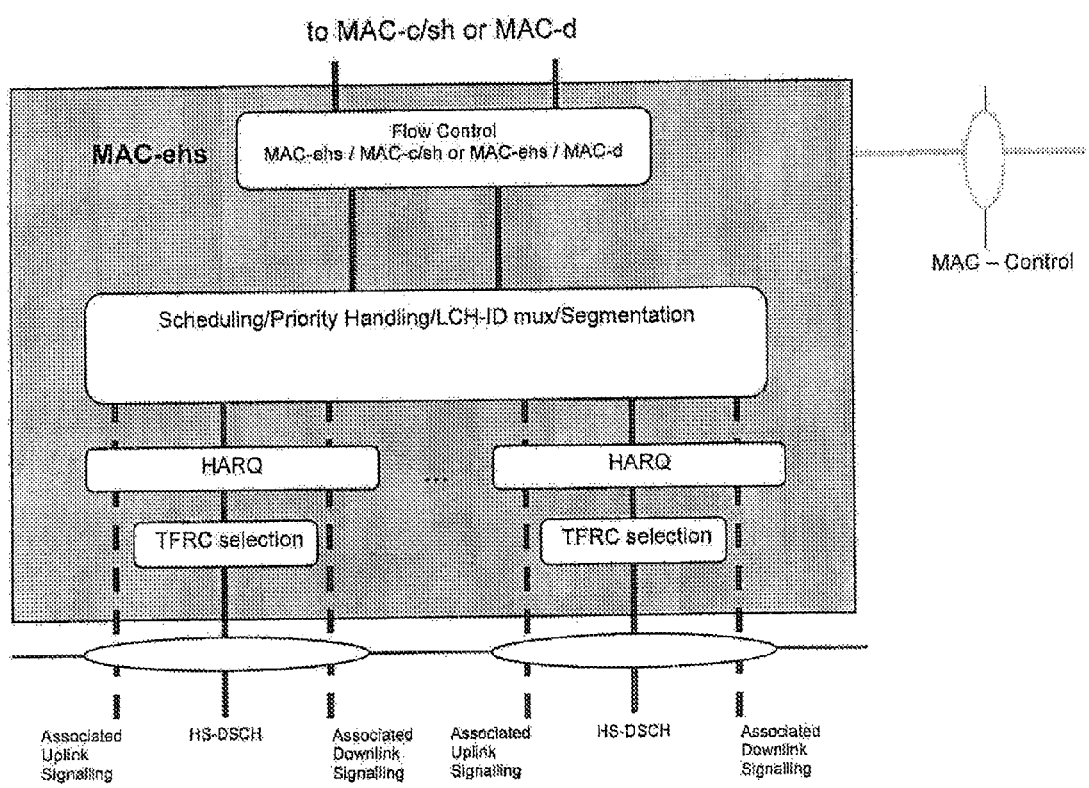
FIG. 6 illustrates schematically a medium access control (MAC) entity in a wireless terminal (UE)

According to embodiments of present inventive concepts, a HARQ process in a MAC-ehs of wireless terminal processor 101 may provide MAC functionality illustrated in FIG. 6. FIG. 6 illustrates MAC (Media Access Control) functionality at wireless terminal 200. As shown in FIG. 5, one HARQ entity may handle HARQ functionality for one user per HS-DSCH (High Speed Downlink Shared Channel). One HARQ entity may be capable of supporting multiple instances (multiple HARQ processes) of stop and wait HARQ protocols. According to some embodiments, there shall be one HARQ entity per HS-DSCH, one HARQ process per TTI (Transmission Time Interval) for single stream transmission, and two HARQ processes per TTI for dual streams (2 rank/layer) transmission, three streams (3 rank/layer) transmission, and four streams (4 rank/layer) transmission.

Because only 2 HARQ processes are supported for three downlink streams (3 rank/layer) and for four downlink streams (4 rank/layer), the mapping of soft buffers may be provided according to the table of FIG. 7A for rank 3 downlink transmissions and according to the table of FIG. 7B for rank 4 downlink transmissions. Note that any one of the combinations of FIG. 7A may be used for rank 4 downlink transmission, and that any one of the combinations of FIG. 7B may be used for rank 3 down link transmissions. Whenever the data indicator (also referred to as an indicator or a data indicator) for a shared HARQ process (i.e., a HARQ process shared by two or more streams/layers) indicates that new data has been initially transmitted over the downlink (e.g., the data indicator bit has been toggled), the soft buffers for both/all streams associated with the shared HARQ process should be cleared. Whenever the data indicator (also referred to as an indicator or a new data indicator) for a shared HARQ process (i.e., a HARQ process shared by two or more streams/layers) indicates that old data is being retransmitted, the soft buffers for both/all streams associated with the shared HARQ process should be combined with the retransmitted data of the respective data streams.

For rank/layer one transmissions, a single HARQ process may be used for the single downlink data stream. Accordingly, one data indicator flag may be transmitted by base station for one transport data block of the downlink data stream, and wireless terminal 200 may receive the one transport data block using DM1, SB1, and CD1. If the data indicator indicates that the transport data block is a new/initial transmission, wireless terminal 200 may clear soft buffer SB1 and attempt to decode using channel decoder CD1. If the data indicator indicates that the transport data block is a retransmission of a previously failed transmission, wireless terminal 200 may combine soft bits of the retransmission (generated by demodulator/deinterleaver DM1) with soft bits from soft buffer SB1 and attempt to decode the combination using channel decoder CD1. If channel decoder CD1 is able to successfully decode the transmission/retransmission, an ACK message is generated and transmitted to base station 100 (e.g., as an element of a HARQ-ACK codeword). If channel decoder CD1 is unable to decode the transmission/retransmission, a NACK message is generated and transmitted to base station 100 (e.g., as an element of a HARQ-ACK codeword). A single HARQ process (including a data indicator/flag, a NACK message and/or an ACK message) may thus map to each transport data block transmitted over the rank/layer one downlink data stream.

For rank/layer two transmissions, a first HARQ process (including a data indicator/flag, a NACK message and/or an ACK message) may map to each transport data block transmitted over a first stream of the rank two transmission, and a second HARQ process (including a data indicator/flag, a NACK message and/or an ACK message) may map to each transport data block transmitted over a second stream of the rank two transmission. Each of the first and second HARQ processes may thus operate for transport data blocks of respective streams of the rank two transmissions as discussed above with respect to rank/layer one transmissions. Stated in other words, a respective data indicator/flag may be provided for each transport data block received during a same TFRE, soft buffers for the respective downlink data streams may be independently cleared or maintained for retransmission combining responsive to the respective data indicators/flags, and respective ACK/NACK messages may be generated and transmitted to base station 100 for each transport data block received during a same TFRE.

For higher order transmission ranks/layers, however, a HARQ process may be shared by two or more downlink data streams to reduce uplink feedback signaling. For rank/layer three downlink transmissions, a first HARQ process (including a data indicator/flag, a NACK message and/or ACK message) may map to each transport data block of a first stream received using DM1, SB1, and CD1 as discussed with respect to rank/layer one and two downlink transmissions. A second HARQ process, however, may be shared for transport data blocks of a second stream received using DM2, SB2, and CD2 and a third streams received using DM3, SB3, and CD3. Accordingly, first, second, and third transport data blocks may be transmitted during a same TFRE over respective the first, second, and third streams. A first data indicator flag may be transmitted by base station 100 for the first transport data block of the first stream, and soft buffer SB1 may be cleared if the first data indicator indicates that the first transport data block is an initial transmission, or soft buffer SB1 may be maintained for combined decoding if the first data indicator indicates that the first transport data block is a retransmission.

A second data indicator flag may be transmitted by base station 100 for both of the second and third transport data blocks of the second and third downlink data streams. If the second data indicator indicates a new/initial transmission, wireless terminal 200 may clear soft buffers SB2 and SB3 and attempt to decode the second and third transport data blocks using channel decoders CD2 and CD3. If the second data indicator indicates a retransmission, wireless terminal 200 may combine soft bits of the second and third transport data blocks (generated by demodulators/deinterleavers DM2 and DM3) with soft bits from respective soft buffers SB2 and SB3 and attempt to decode the combinations using respective channel decoders CD2 and CD3. If both channel decoders CD2 and CD3 are able to successfully decode the transmissions/retransmissions, an ACK message is generated and transmitted to base station 100 (e.g., as an element of a shared HARQ-ACK process). If either of channel decoders CD2 or CD3 is unable to decode the transmissions/retransmissions, a NACK message is generated and transmitted to base station 100 (e.g., as an element of a shared HARQ-ACK process). A single HARQ process (including a single data indicator/flag, a single NACK message and/or a single ACK message) may thus be shared by two transport data blocks transmitted over different downlink data streams during a same TFRE.

For rank/layer four downlink transmissions according to some embodiments, the first HARQ process may be shared between a first stream (e.g., received using DM1, SB1, and CD1) and a second stream (e.g., received using DM2, SB2, and CD2), and the second HARQ process may be shared between a third stream (e.g., received using DM3, SB3, and CD3) and a fourth stream (e.g., received using DM4, SB4, and CD4). For rank/layer four downlink transmissions according to some other embodiments, the first HARQ process may be shared between a first stream (e.g., received using DM1, SB1, and CD1) and a fourth stream (e.g., received using DM4, SB4, and CD4), and the second HARQ process may be shared between a second stream (e.g., received using DM2, SB2, and CD2) and a third stream (e.g., received using DM3, SB3, and CD3). The sharing of a HARQ process between any two data streams may be the same as discussed above with respect the sharing of the second HARQ process between second and third data streams during rank/layer three transmissions. Where a HARQ process is shared between two streams, the HARQ process provides one data indicator and one ACK/NACK message for each TFRE for all data streams sharing the HARQ process. Operations of a HARQ process shared by multiple data streams will now be discussed in greater detail below with respect to the flow charts of FIGS. 8A and 8B.

Figure 8A:
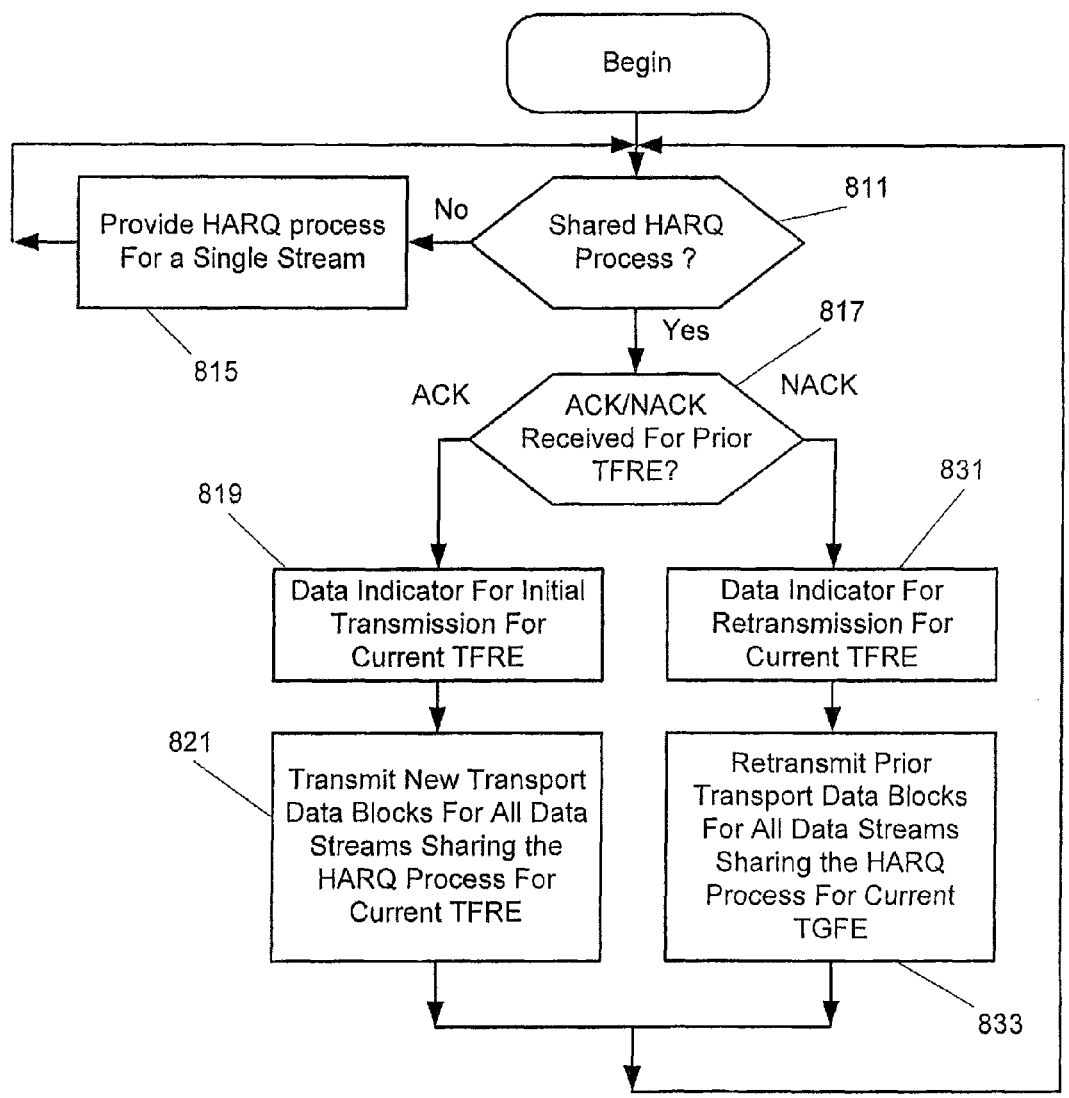

FIG. 8A illustrates operations of a base station 100 transmitting multiple MIMO data streams using a shared HARQ process according to some embodiments of present inventive concepts, and FIG. 8B illustrates operations of a wireless terminal 200 receiving multiple MIMO data streams using a shared HARQ process according to some embodiments of present inventive concepts. Operations of FIGS. 8A and 8B will be discussed concurrently because the base station and wireless terminal operations may be interleaved.

As shown in FIG. 8A, base station processor 101 may determine for a HARQ process if the HARQ process is being applied to a single MIMO data stream or if the HARQ process is being shared by multiple (e.g., two) MIMO data streams at block 811. If the HARQ process is being applied to only one MIMO data stream, the HARQ process may be applied individually to the single MIMO data stream at block 815 so that one ACK/NACK message (received from wireless terminal 200) from the prior TFRE is applied only to the single MIMO data stream for the current TFRE, and so that one data indicator is applied only to the single MIMO data stream for the current TFRE. As discussed above with respect to a four antenna system, for example, a first HARQ process (HARQ-1) may be applied to individually to a first MIMO data stream (e.g., using TB1, CE1, IM1, DM1, SB1, and/or CD1) for rank 1, rank 2, and rank 3 transmission/reception, and a second HARQ process (HARQ-2) may be applied individually to a second MIMO data stream (e.g., using TB2, CE2, IM2, DM2, SB2, and/or CD2) for rank 2 transmission/reception.

If the HARQ process is being shared by multiple MIMO data streams at block 811, base station processor 101 may determine whether an ACK message or a NACK message was received in response to transport data blocks transmitted over the multiple MIMO data streams in a/the preceding TFRE. As discussed above, one ACK or NACK message may be transmitted by wireless terminal 200 for a plurality data streams sharing a HARQ process. As discussed above with respect to a four antenna system, for example, a first HARQ process (HARQ-1) may be shared by a first MIMO data stream (e.g., using TB1, CE1, IM1, DM1, SB1, and/or CD1) and a fourth MIMO data stream (e.g., using TB4, CE4, IM4, DM4, SB4, and/or CD4) for rank 4 transmission/reception, and a second HARQ process (HARQ-2) may be shared by a second MIMO data stream (e.g., using TB2, CE2, IM2, DM2, SB2, and/or CD2) and a third MIMO data stream (e.g., using TB2, CE2, IM2, DM2, SB2, and/or CD2) for rank 3 and rank 4 transmission/reception.

If an ACK message was received for the prior TFRE transmission at block 817, base station processor 101 may generate and transmit a data indicator indicating an initial transmission of new data for all transport data blocks being transmitted during the current TFRE for the data streams sharing the HARQ process at block 819. At block 821, base station processor 101 may generate and transmit new transport data blocks for all data streams sharing the HARQ process.

If a NACK message was received for the prior TFRE transmission at block 817, base station processor 101 may generate and transmit a data indicator indicating a retransmission of the prior data for all transport data blocks being transmitted during the current TFRE for the data streams sharing the HARQ process at block 831. At block 833, base station processor 101 may retransmit the previously transmitted transport data blocks for all data streams sharing the HARQ process. A single NACK message may thus result in retransmission of transport data blocks for all data streams sharing the HARQ process.

As shown in FIG. 8B, responsive to receiving data for a TFRE at block 849, wireless terminal processor 201 may determine for a HARQ process if the HARQ process is being applied to a single MIMO data stream or if the HARQ process is being shared by multiple (e.g., two) MIMO data streams at block 851. If the HARQ process is being applied to only one MIMO data stream, the HARQ process may be applied individually to the single MIMO data stream at block 853 so that one ACK/NACK message generated for only the single MIMO data stream, and so that a data indicator is applied only to the single MIMO data stream for the current TFRE. As discussed above with respect to a four antenna system, for example, a first HARQ process (HARQ-1) may be applied individually to a first MIMO data stream (e.g., using TB1, CE1, IM1, DM1, SB1, and/or CD1) for rank 1, rank 2, and rank 3 transmission/reception, and a second HARQ process (HARQ-2) may be applied individually to a second MIMO data stream (e.g., using TB2, CE2, IM2, DM2, SB2, and/or CD2) for rank 2 transmission/reception.

If the HARQ process is being shared by multiple MIMO data streams at block 851, wireless terminal processor 201 may determine at block 855 whether a data indicator (transmitted by base station 100) indicates that the transport data blocks are initial transmissions of new data or retransmissions of data transmitted in a previous TFRE. As discussed above with respect to a four antenna system, for example, a first HARQ process (HARQ-1) may be shared by a first MIMO data stream (e.g., using TB1, CE1, IM1, DM1, SB1, and/or CD1) and a fourth MIMO data stream (e.g., using T134, CE4, IM4, DM4, SB4, and/or CD4) for rank 4 transmission/reception, and a second HARQ process (HARQ-2) may be shared by a second MIMO data stream (e.g., using TB2, CE2, IM2, DM2, SB2, and/or CD2) and a third MIMO data stream (e.g., using TB2, CE2, IM2, DM2, SB2, and/or CD2) for rank 3 and rank 4 transmission/reception.

If the transport data blocks of the shared HARQ process are initial transmissions of new data, all soft buffers of the data streams sharing the HAQ process are cleared at block 861 (responsive to the one data indicator), and each of the transport data blocks of the data streams sharing the HARQ process are separately demodulated at block 863 to generate soft bits for the respective transport data blocks. The soft bits for the respective transport data blocks are decoded at block 865 to generate the original transport data blocks. If all of the current transport data blocks (of the current TFRE) of the MIMO data streams sharing the HARQ process are successfully decoded at block 867, one ACK message may be generated and transmitted to base station 100 at block 869 for all of the transport data blocks sharing the HARQ process. If one of the current transport data blocks (of the current TFRE) of the MIMO data streams sharing the HARQ process fails decoding at block 867, one NACK message may be generated and transmitted to base station 100 at block 871 for all of the transport data blocks sharing the HARQ process.

If the transport data blocks of the shared HARQ process are retransmissions at block 855, all soft buffers of the data streams sharing the HAQ process are maintained at block 881 (responsive to the one data indicator indicating retransmission), and each of the transport data blocks of the data streams sharing the HARQ process are separately demodulated at block 883 to generate soft bits for the respective transport data blocks. The soft bits for the respective transport data blocks are then combined with the corresponding soft bits from respective soft buffers at block 885, and the combinations of old/new soft bits are separately decoded at block 887 to generate the original transport data blocks. If all of the current transport data blocks (of the current TFRE) of the MIMO data streams sharing the HARQ process are successfully decoded at blocks 887 and 867, one ACK message may be generated and transmitted to base station 100 at block 869 for all of the transport data blocks sharing the HARQ process. If one of the current transport data blocks (of the current TFRE) of the MIMO data streams sharing the HARQ process fails decoding at block 867, one NACK message may be generated and transmitted to base station 100 at block 871 for all of the transport data blocks sharing the HARQ process.

Additional embodiments of present inventive concepts are discussed as follows.

A number of HARQ codewords may correspond to the number of HARQ processes. With 2 codewords there would be 2 HARQ processes. The number of streams (layers) corresponds to the rank of the transmission.

For a 2 codeword MIMO, a wireless terminal (UE) 200 may send channel state information through the feedback channel to the network (60). The feedback information may include Rank Information (RI), Channel Quality Information (CQI) and the Precoding control Index (PCI). The RI may include 2 bits to indicate the type of rank transmission, i.e. rank 1, rank 2, rank 3 or rank 4. A The scheduler (e.g., implemented at base station 100 processor 101) may determine for each TTI (time transmission interval) which type of rank to be used.

Each UE implementing HARQ functionality with soft combining may have a block(s) called a soft buffer(s). Each soft buffer may store the soft values during transmission and retransmission. In general for Release 7 MIMO, each soft buffer is mapped one to one with a HARQ process, i.e. one soft buffer is provided for each HARQ process. When 2

HARQ processes are mapped to four antennas, however, proper mechanisms may be needed to map the soft buffers in the UE receiver to the HARQ processes in order to enable HARQ functionality with soft combining.

Methods are outlined to implement the mapping functionality between the soft buffer(s) and the HARQ process(es) at the UE side when the number of HARQ processes is less than number of layers supported in the system, e.g. for rank 3 or rank 4 transmissions/receptions and 2 HARQ-processes.

According to some embodiments, a method may be provided in a wireless terminal (LIE) with HARQ with soft combining functionality within a wireless communication system, whereby the wireless communication system supports multiflow MIMO downlink transmissions. The method may include receiving, from a network node, a data indicator included in the downlink signaling. The method may further include determining, based on the data indicator, whether soft combining should be performed on the currently received transport block/data transmission or not.

The UE may determine, based on the data indicator, whether the current transmission is a retransmission of previously transmitted data or whether it is an initial transmission of new data. For example, a data indicator for each HARQ process may be received from the network node. Accordingly, for a rank 3 transmission or a rank 4 transmission a first data indicator is received for the first HARQ process and a second data indicator is received for the second HARQ process. The data indicator may, for example, be a single-bit data indicator. The method may further include soft combining buffered data from a previous transmission with data from a current transmission, if the data indicator indicates that the current transmission is a retransmission. The method may further include deleting/clearing data received in a previous transmission and stored in a soft buffer, if the data indicator indicates that the current transmission is not a retransmission but an initial transmission.

According to some embodiments, a method may be provided in a network node within a wireless communication system, whereby the wireless communication system supports multiflow MIMO downlink transmissions. The network node (also referred to as a base station) may be a Node B or an eNode B. The method may include providing of including, in the downlink transmission, a data indicator. For example, a data indicator for each HARQ process may be included in the downlink transmission. Accordingly, for a rank 3 transmission or a rank 4 transmission a first data indicator is signalled for the first HARQ process and a second data indicator is signalled for the second HARQ process. The data indicator may be a one-bit data indicator. The method may further include changing the value of the data indicator when a current transmission is an initial transmission. Changing the data indicator value may include incrementing the data indicator value. For a one-bit data indicator, the bit may be toggled for downlink transmission of each transport block which is an initial transmission (i.e., not a retransmission). The method may further include not amending the data indicator (i.e., keeping the present value of the data indicator) if the current downlink transmission is a retransmission of previously transmitted data (e.g., a retransmission of a previously transmitted transport block).

Figure 9:
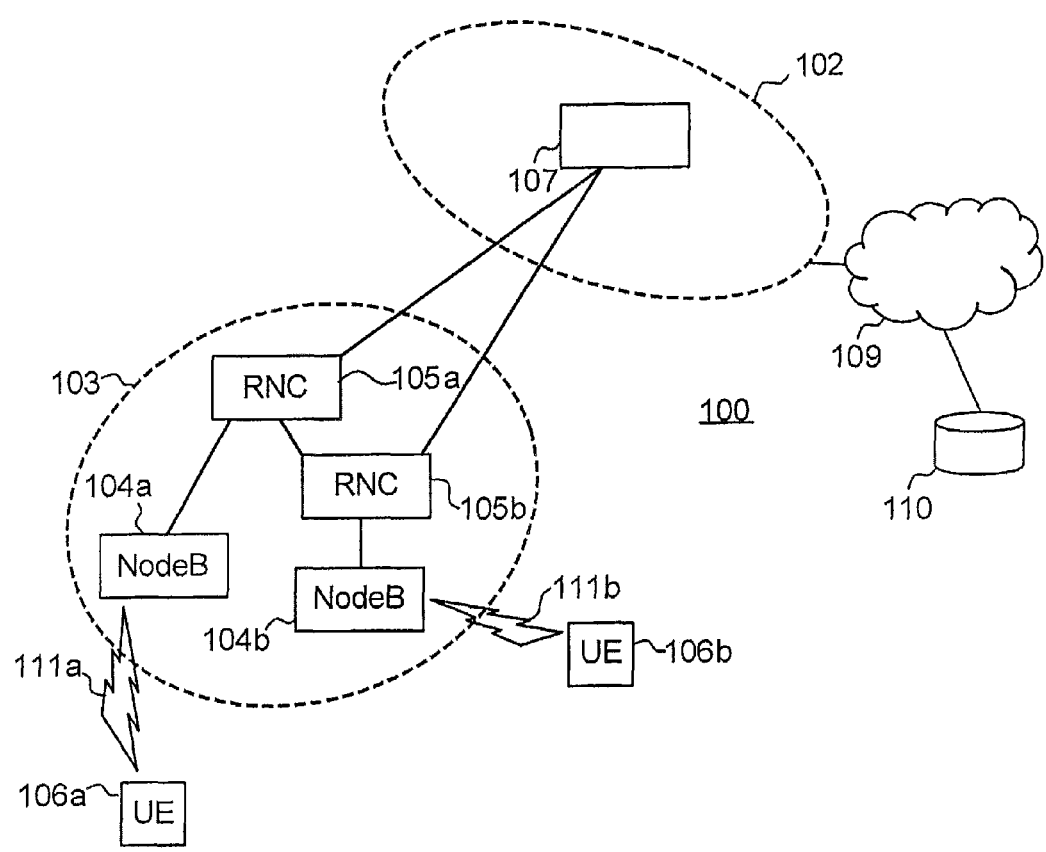
FIG. 9 schematically illustrates a mobile communication system according to some embodiments discussed herein.

FIG. 9 illustrates schematically a universal mobile telecommunications system, UMTS, network 100 in which embodiments of present methods and apparatuses can be implemented. It should be noted, however, that implementations may be performed in other similar communication systems involving transmission of coded data between nodes.

In FIG. 9 the UMTS network 100 may include a core network 102 and a UMTS terrestrial radio access network, UTRAN, 103. The UTRAN 103 may include a number of nodes in the form of radio network controllers, RNC, 105a, 105b, each of which is coupled to a set of neighbouring nodes in the form of one or more NodeB 104a, 104b (also referred to as base stations). Each NodeB 104 is responsible for a given geographical radio cell, and the controlling RNC 105 is responsible for routing user and signalling data between that Node B 104 and the core network 102. All of the RNC's 105 are coupled to one another. A general outline of the UTRAN 103 is given in 3GPP technical specification TS 25.401 V3.2.0.

FIG. 9 also illustrates communicating entities in the form of mobile devices or user equipment, UE, 106a, 106b connected to a respective NodeB 104a, 104b in the UTRAN 103 via a respective air interface(s) 111a, 111b. Mobile devices served by one Node B, such as UE 1Q6a served by NodeB 104a, are located in a so-called radio cell. The core network 102 may include a number of nodes represented by node 107 and may provide communication services to the UE 106 via the UTRAN 103, for example, when communicating with the Internet 109 where, schematically, a server 110 illustrates an entity with which the mobile devices 106 may communicate. The network 100 in FIG. 9 may include a large number of similar functional units in the core network 102 and the UTRAN 103, and in typical realizations of networks, the number of mobile devices may be very large.

Furthermore, as will be discussed in greater detail below, communication between the nodes in the UTRAN 103 and the mobile devices 106 may follow the protocols as specified by 3GPP HSDPA specifications.

FIG. 3A illustrates a message sequence chart for a MIMO system including a NodeB and a UE, such as any of the NodeB's and UE's described above in connection with FIG. 1 and/or FIG. 9. As shown in FIG. 3A, the UE receives pilot signals and estimates 210 the channel from the pilot signals. The UE generates/computes 220 the channel state information from the estimated channel. The UE reports the channel state information to the Node B through a feedback channel.

An example of a feedback channel report for two reporting intervals is shown in FIG. 3B. As shown in FIG. 3B, the feedback channel report may include acknowledgement/negative acknowledgement (ACK/NAK) information and a channel quality indicator/pre-coding control indication (CQI/PCI).

FIG. 4 illustrates a block diagram of a two code word MIMO system with four channel encoders in a transmitter 400 in a NodeB, such as any of the NodeBs and/or base stations in FIG. 9 and/or in FIG. 1. From the UE feedback information, the adaptive controller chooses the transport block length, modulation order and the coding rate. It also generates the precoding weight information. It is to be noted that even though there are four channel encoders, feedback information corresponding to a maximum of two code words is received (i.e., two HARQ processes). The mapping of HARQ process to the channel encoder 403 and/or interleaver/modulator 405 can be done according to three possible combinations. Here, for ease of discussion, direct mapping is used for rank 1 and rank 2. For rank 3 transmissions for this example, the first HARQ process is mapped to the first two encoders and the second HARQ process to the third encoder. Similarly for rank 4 transmissions for this example, the first HARQ process is mapped to the first two encoders and the second HARQ process to the third and fourth encoders.

Based on the rank chosen by adaptive controller 415, transport blocks passed to channel encoder 403 and the output is interleaved and modulated by modulator 405. The output of modulator 405 is mapped to the space time layers by layer mapper 407. For this example, the layers are mapped one to one, but other mappings may be used. Once the layer mapping is done, the resultant symbols are spread and scrambled using spreader/scrambler 409. Precoding is applied on the output of spreader and scrambler 409, and the output signal(s) may be passed to the corresponding antenna ports Ant-1, Ant-2, Ant-3, and Ant-4.

FIG. 5 illustrates a block diagram showing circuitry and/or elements of a receiver 500 in a UE, such as any of the UE's in FIG. 9 and/or in FIG. 1. From signals received via antennas Ant-1', Ant-2', Ant-3', and Ant-4', a MIMO detector (typically a minimum mean square error, MMSE, receiver) implemented in layer decoder 601 reduces the interference from the multipath and the other antenna interference, and MIMO detection may be performed as a converse to operations performed by precoder 411. Layer decoder 601 may further perform despreading/descrambling as a converse to operations performed by spreader/scrambler 409. Layer demapper 603 may perform a converse to operations performed by layer mapper 407, demodulator(s)/deinterleavers DM1-4 may perform a converse to operations performed by interleavers/modulators IM1-4, and channel decoders CD1-CD4 may perform a converse to operations performed by channel encoders CE1-4.

After despreading the UE tries to decode the coded bits. If the decoding attempt fails, the UE buffers the received soft bits in a respective soft buffer(s) and requests a retransmission by sending NAK. Once the retransmission occurs, the UE combines the buffered soft bits with the received soft bits from the retransmission(s) and tries to decode the combination. Aspects of Hybrid ARQ (HARQ) with soft combining are described, for example, in Dahlman et al. "3G Evolution HSPA and LTE for mobile broadband", $2^{nd}$ edition 2008, page 120ff.

It can be seen that for rank 4 transmissions, the UE may receive up to four transport blocks. This means that, after channel decoding, the UE may generate four local ACK/NAK results. Similarly, for rank 3 transmissions, the UE may generate three local ACK/NAK results. For rank 2 transmissions, the UE may generate two local ACK/NAK results. For rank 2 and rank 1 transmissions, these local ACK/NAK results can be directly mapped to the respective HARQ process(es)/codeword(s)/identification(s) that is/are transmitted to the base station.

Turning now to FIG. 6, which shows a block diagram of a MAC-ehs entity in a UE, such as in any of the UE's in FIG. 9 and/or in FIG. 1. The MAC-ehs entity may perform a number of different tasks, including HARQ processing, but for the sake of clarity only HARQ functionality is described in the present disclosure.

Figure 10:
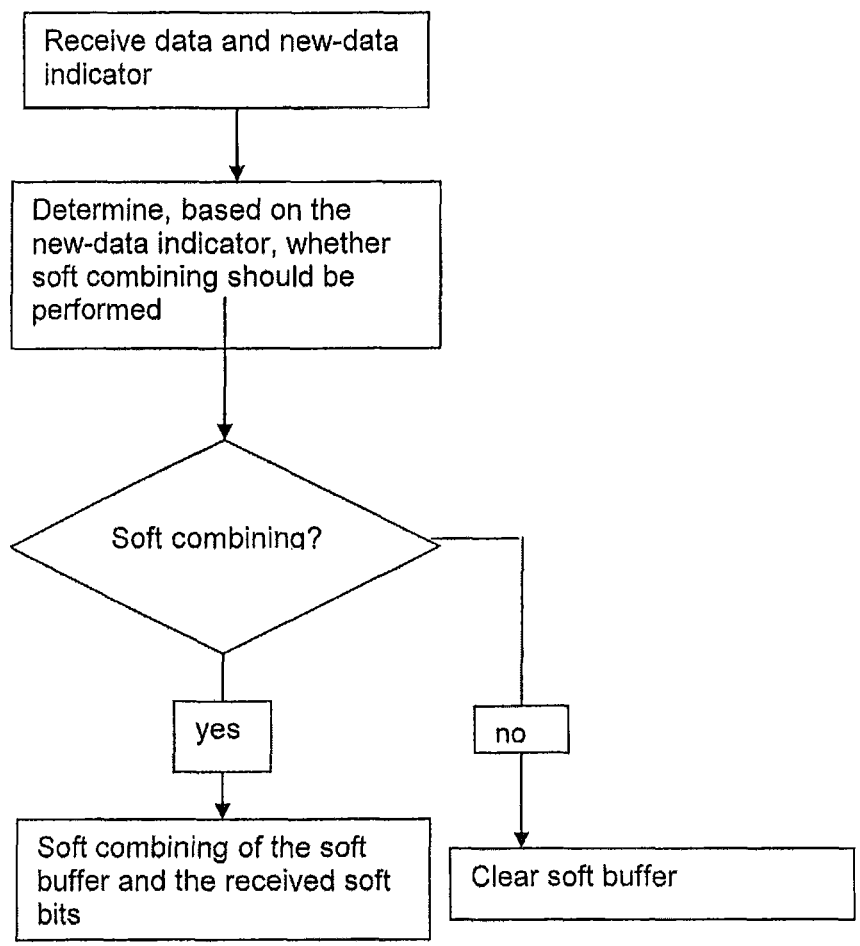
FIG. 10 is a flowchart of a method in a UE according to some embodiments.
Figure 11:
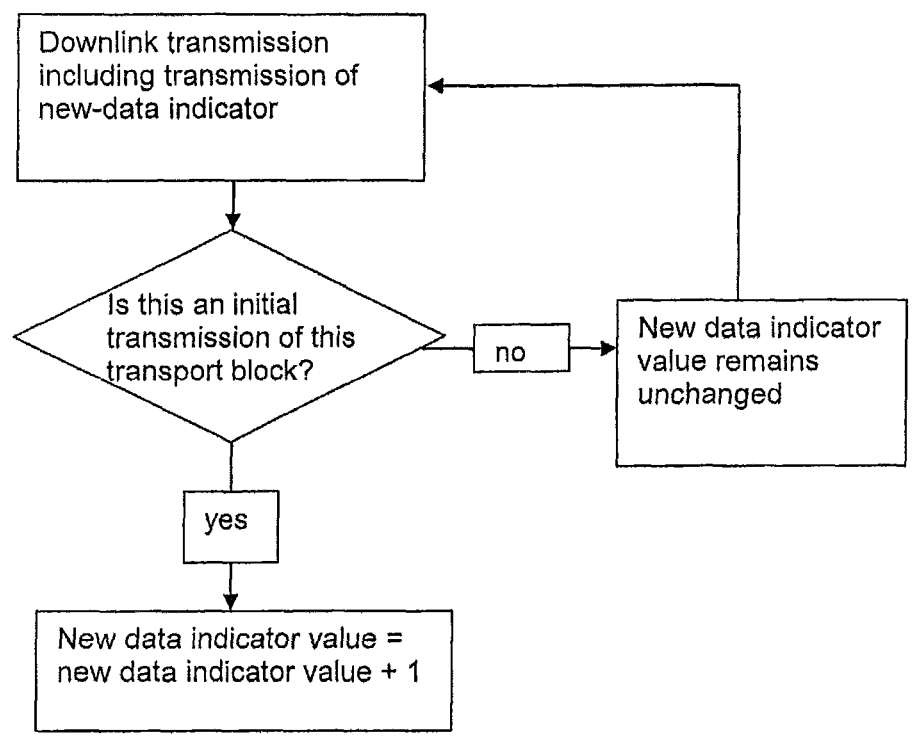
FIG. 11 is a flowchart of a method embodiment in a network node according to some embodiments.

For soft combining to operate properly, the UE may be informed whether the transmission is a retransmission of previously transmitted data or whether it is an initial transmission of new data. For this purpose, the downlink control signaling includes a data indicator for each HARQ process. Accordingly, for a rank 3 transmission or a rank 4 transmission, a first data indicator is signalled for the first HARQ process and a second data indicator is signaled for the second HARQ process. The data indicator may, for example, be a single-bit data indicator. The data indicator is used by the UE to control whether the soft buffer(s) should be cleared or whether soft combining of the soft buffer(s) and the received soft bits should take place as illustrated in FIG. 10. FIG. 11 illustrates an example of a related method in a network node (e.g., a NodeB).

Whenever the current transmission is an initial transmission and not a retransmission, the NodeB MAC-ehs changes the data indicator. For example, if the current transmission is not a retransmission (i.e., it is an initial transmission of new data), then the NodeB MAC-ehs increments the data indicator. Hence, for each new transport block, the data indicator bit is toggled. Based on the single-bit data indicator, the UE determines whether the soft buffer should be cleared or whether the received soft bits are to be combined with the contents of the soft buffer for soft combining. For an initial transmission of new data, by definition no soft combining should be done and, accordingly, the soft buffer shall be cleared.

The data indicator may also be used to detect error cases in the status signaling. For example, if the new-data indicator is not toggled despite the fact that the previous data for the associated hybrid-ARQ (HARQ) process in question was correctly decoded and acknowledged, an error in the uplink signaling has most likely occurred. Similarly, if the data indicator is toggled but the previous data for the hybrid-ARQ (HARQ) process was not correctly decoded, the UE will replace the data previously stored in the soft buffers with the new received data.

It can be seen that for a rank 4 transmission, the UE may receive up to 4 transport blocks. After channel decoding, the UE may generate four local ACK/NAK results. Similarly, for rank 3 transmissions, the UE may generate three local ACK/NAK results. For rank 2 transmissions, the UE may generate two local ACK/NAK results, and for rank 1 transmissions, the UE may generate one local ACK/NAK result. For rank 2 and rank 1 transmissions, the UE can directly map these ACK/NAK results to the HARQ process(es)/codeword(s)/identification(s).

As shown in FIG. 6, one HARQ entity may handle the hybrid ARQ functionality for one user per HS-DSCH transport channel. One HARQ entity is capable of supporting multiple instances (HARQ process) of stop and wait HARQ protocols. There may be one HARQ entity per HS-DSCH, one HARQ process per TTI (Transmission Time Interval) for single stream transmission and two HARQ processes per TTI for two, three, and four layer/stream transmissions.

Since only 2 HARQ processes are supported for three steams and four stream transmissions, the mapping of soft buffers may be provided according to FIGS. 7A and 7B for rank 3 and rank 4. Please note that any one of the combination of FIGS. 7A and 7B may be used.

Whenever the data indicator for the particular HARQ process is toggled, the soft buffer corresponding to the HARQ process should be cleared.

Whenever the data indicator flag is toggled (for old/retransmitted data), the soft buffers corresponding to the individual HARQ process should be combined separately (i.e., individual soft combining in the same HARQ process).

A HARQ process (e.g., HARQ-1 or HARQ-2) and a respective HARQ identification (e.g., H_a and/or H_b) may be used to support downlink transmissions/retransmissions from base station 100 to wireless terminal 200, and two HARQ processes and respective HARQ identifications may support HARQ ACK/NACK signaling for 4 antenna MIMO systems supporting up to 4 layer/stream downlink transmissions (and/or higher antenna systems supporting higher rank/layer transmissions). For rank 1 transmissions, first HARQ process/identification HARQ-1/H_a maps to a first transmission/reception layer (e.g., including TB1, CE1, IM1, DM1, SB1, and/or CD1). For rank 2 transmissions, first HARQ process/identification HARQ-1/H_a maps to the first transmission/reception layer, and second HARQ process/identification HARQ-2/H_a maps to a second transmission/reception layer (e.g., including TB2, CE2, IM2, DM2, SB2, and/or CD2). For rank 3 transmissions, first HARQ process/identification HARQ-1/H_a maps to the first transmission/reception layer, and second HARQ process/identification HARQ-2/H_b maps to the second transmission/reception layer and to a third transmission/reception layers (e.g., including TB3, CE3, IM3, DM3, SB3, and/or CD3). For rank 4 transmissions, first HARQ process/identification HARQ-1/H_a maps to the first transmission/reception layer and to a fourth transmission/reception layer (e.g., including TB4, CE4, IM4, DM4, SB4, and/or CD4), and second HARQ process/identification HARQ-2/H_b maps to the second and third transmission/reception layers.

Because of the delay between base station 100 transmitting a first data block(s) to wireless terminal 200 during a first downlink TTI/TFRE and receiving a HARQ ACK/NACK response(s) for the first data block(s) from wireless terminal 200, second data block(s) may be transmitted to wireless terminal 200 during a second downlink TTI/TFRE before receiving the HARQ ACK/NACK response(s) for the first data block(s). Accordingly, HARQ process identifications may be used by base station 100 to distinguish between different HARQ ACK/NACK responses for different data blocks of different downlink TTIs/TFREs transmitted to the same wireless terminal 200. Stated in other words, HARQ process identifications may be used to match HARQ ACK/NACK responses with the appropriate data block(s) and TTI/TFRE. HARQ process identifications may also be used by wireless terminal 100 to match the data block/blocks with the appropriate soft bits from respective soft buffer/buffers.

A same HARQ process identification may thus be used for the initial transmission and for each retransmission of a data block/blocks to wireless terminal 200 until either the data block/blocks is/are successfully received/decoded by wireless terminal 200 (as indicated by an ACK) or until a maximum allowed number of retransmissions have occurred. Once the data block/blocks have been successfully received/decoded or a maximum number of retransmissions has occurred, the HARQ process identification for the data block/blocks may be destroyed, meaning that the HARQ process identification may then be reused for a new data block/blocks.

Accordingly to some embodiments, a HARQ process identification may be selected from one of eight values (e.g., 1, 2, 3, 3, 5, 6, 7, or 8). For rank 1, 2, and 3 downlink transmissions to wireless terminal 200, HARQ process identification H_a is mapped to a first HARQ process HARQ-1 for layer 1 transmission using the first transmission/reception layer (e.g., including TB1, CE1, IM1, DM1, SB1, and/or CD1). For rank 4 downlink transmissions to wireless terminal, HARQ process identification H_a is mapped to the first HARQ process HARQ-1 for layer 1 and 4 transmissions using the first and fourth transmission/reception layers. For rank 2 downlink transmissions to wireless terminal 200, HARQ process identification H_b is mapped to second HARQ process HARQ-2 for layer 2 transmission using the second transmission/reception layer. For rank 3 and 4 downlink transmissions to wireless terminal, HARQ process identification H_b is mapped to the second HARQ process HARQ-2 for layer 2 and 3 transmissions using the second and third transmission/reception layers. Accordingly, HARQ process HARQ-1 and identification H_a are used for rank 1, 2, 3, and 4 transmissions, and HARQ process HARQ-2 and identification H_b are used for rank 2, 3, and 4 transmissions.

For an initial rank 1 transmission of a data block, a currently unused identification value (e.g., selected from 1-8) is assigned to H_a for HARQ process HARQ-1, and H_a is used to identify the instance of HARQ-1 that is applied to transmissions/retransmissions of the layer 1 data block and that is applied to HARQ ACK/NACK responses corresponding to the layer 1 data block.

For an initial rank 2, 3, or 4 transmission of data blocks using both HARQ processes HARQ-1 and HARQ-2 during a same TTI/TFRE, a currently unused identification value (e.g., selected from 1-8) is assigned to H_a for HARQ process HARQ-1, and another identification value is assigned to H_b for process HARQ-2 (e.g., as a function of H_a). Accordingly, H_a is used to identify the instance of HARQ-1 that is applied to transmissions/retransmissions of layer 1/4 data block/blocks (for layer 1 and/or 4 transmissions/retransmissions) and that is applied to HARQ ACK/NACK responses corresponding to the layer 1/4 data blocks, and H_b is used to identify the instance of HARQ-2 that is applied to transmissions/retransmissions of the layer 2/3 data block/blocks (for layer 2 and/or 3 transmissions/retransmissions) and that is applied to HARQ ACK/NACK responses corresponding to the layer 2/3 data block/blocks.

According to some embodiments, HARQ process identification H_b may be assigned as a function of HARQ process identification H_a. With eight different HARQ process identification values from one to eight, for example, identification H_b may be assigned according to the following formula:

$$H\_b = (H\_a + N/2) \bmod(N),$$

where N is the number of HARQ processes (e.g., two for HARQ-1 and HARQ-2) as configured by higher layers and/or by the radio network controller. With two HARQ processes and eight different HARQ process identification values, identification H_b may be selected as a function of H_a according to the following table:

| H_a | H_b | H_a | H_b |
| --- | --- | --- | --- |
| 1 | 5 | 5 | 1 |
| 2 | 6 | 6 | 2 |
| 3 | 7 | 7 | 3 |
| 4 | 8 | 8 | 4 |

Accordingly, only one of the HARQ process identifications (e.g., H_a) may need to be transmitted between base station 100 and wireless terminal 200, with the other HARQ process identification (e.g., H_b) being derived at the receiving device using H_a.

According to some embodiments, a method for improving HARQ in a mobile communication device may include receiving a plurality of data streams, performing HARQ processing that comprises a mapping such that a first plurality of ACK/NAK's corresponding to the received data streams are mapped to a second plurality of ACK/NAK's, the second plurality of ACK/NAK's being less than the first plurality of ACK/NAK's.

A mobile communication device may include circuitry configured to perform such a method.

That is, HARQ functionality may be provided in a UE where the number of HARQ processes is less than the number of MIMO layers or streams supported in the system. This may be advantageous, for example, in that it may enable reduced signaling between entities in a radio access network.

FIG. 9 illustrates schematically a universal mobile telecommunications system, UMTS, network 100 in which the present methods and apparatuses can be implemented. It should be noted, however, that the skilled person will readily be able to perform implementations in other similar communication systems involving transmission of coded data between nodes.

In FIG. 9, the UMTS network 100 comprises a core network 102 and a UMTS terrestrial radio access network, UTRAN, 103. The UTRAN 103 comprises a number of nodes in the form of radio network controllers, RNC, 105a, 105b, each of which is coupled to a set of neighboring nodes in the form of one or more NodeBs 104a, 104b. Each NodeB 104 is responsible for a given geographical radio cell and the controlling RNC 105 is responsible for routing user and signalling data between that Node B 104 and the core network 102. All of the RNC's 105 are coupled to one another. A general outline of the UTRAN 103 is given in 3GPP technical specification TS 25.401 V3.2.0.

FIG. 9 also illustrates communicating entities in the form of mobile devices or user equipment, UEs, 106a, 106b connected to a respective NodeBs 104a, 104b in the UTRAN 103 via a respective air interface 111a, 111b. Mobile devices served by one Node B, such as UE 106a served by NodeB 104a, are located in a so-called radio cell. The core network 102 comprises a number of nodes represented by node 107 and provides communication services to the UE 106 via the UTRAN 103, for example when communicating with the Internet 109 where, schematically, a server 110 illustrates an entity with which the mobile devices 106 may communicate. As the skilled person realizes, the network 100 in FIG. 9 may comprise a large number of similar functional units in the core network 102 and the UTRAN 103, and in typical realizations of networks, the number of mobile devices may be very large.

Furthermore, as will be discussed in detail in the following, communication between the nodes in the UTRAN 103 and the mobile devices 106 may follow the protocols as specified by 3GPP HSDPA specifications.

FIG. 3A shows a message sequence chart for a MIMO system comprising a NodeB and a UE, such as any of the NodeB's and UE's described above in connection with FIG. 9. As shown in FIG. 3A, the UE receives pilot signals and estimates 210 the channel from the pilot signals. The UE computes/generates 220 the channel state information from the estimated channel. The UE reports the channel state information to the Node B through feedback channel. The typical feedback channel report for two reporting intervals is shown in FIG. 3B. As shown in FIG. 3B, the feedback channel comprises acknowledgement/negative acknowledgement, ACK/NAK, information and the channel quality indicator/pre-coding control indication, CQI/PCI.

FIG. 4 shows a block diagram of a two code word MIMO system with four channel encoders in a transmitter/processor in a NodeB, such as any of the NodeB's in FIG. 9. From the UE feedback information, the adaptive controller chooses the transport block length, modulation order and the coding rate. It also generates the precoding weight information. It is to be noted that even though there are four channel encoders, feedback information corresponding to a maximum of two code words is received, i.e., two HARQ processes. The mapping of HARQ process to the channel encoder/interleaver and modulator can be done according to three possible combinations. Here, for simplicity, for rank 1 and 2 direct mapping is used and for rank 3 transmissions the first HARQ process may be mapped to the first two encoders and the second HARQ process to the third encoder. Similarly for rank 4 transmissions, the first HARQ process may be mapped to the first two encoders and the second HARQ process to the third and fourth encoders.

Based on the rank chosen by the adaptive controller, transport blocks may be passed to the channel encoder and the output may be interleaved and modulated. The output of the interleaver and modulator is mapped to the space time layers by the layer mapper. For this scheme the layers are mapped one to one. Once the layer mapping is done, the resultant symbols are spread and scrambled. Precoding is applied on the output of the spreader and scrambler and the output signal is passed to the corresponding antenna ports.

FIG. 5 illustrates a block diagram showing circuitry of a receiver/processor in a UE, such as any of the UE's in FIG. 9. From signals received via antennas, a MIMO detector (typically a minimum mean square error, MMSE, receiver) in the layer decoder may reduce interference from the multipath and the other antenna interference. Remaining functionalities including despreader & descrambler (in the layer decoder), layer demapper, deinterleaver & demodulator, and the decoder blocks may perform the converse of respective operations of the transmitter blocks described above in connection with FIG. 4.

It can be seen that for rank 4 transmissions, the UE gets up to four transport blocks. This means that, after the decoder, the UE gets four local ACK/NAK's. Similarly, for rank 3 transmissions, the UE will get three local ACK/NAKS. For rank 2 and rank 1 transmissions the UE gets two and one local ACK/NAK, respectively. For rank 2 and rank 1 transmissions these local ACK/NAKS can be directly mapped to the HARQ process(es).

Turning now to FIG. 6, which shows a block diagram of a MAC-ehs entity in a UE such as any of the UE's in FIG. 9. As the skilled person will realize, the MAC-ehs entity performs a number of different tasks, including HARQ processing, but for the sake of clarity only the HARQ functionality is described in the present disclosure.

As shown in FIG. 6, one HARQ entity handles the hybrid ARQ functionality for one user per high-speed downlink shared channel, HS-DSCH, transport channel. One HARQ entity is capable of supporting multiple instances (HARQ process) of stop and wait HARQ protocols. There is one HARQ entity per HS-DSCH, one HARQ process per transmission time interval, TTI, for single stream transmission and two HARQ processes per TTI for dual streams, three streams and four streams transmissions.

Figures 12, 13:
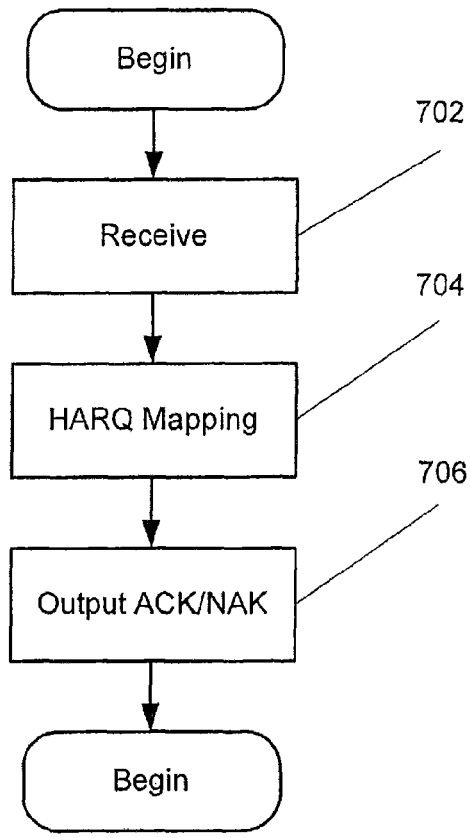
FIG. 12 is a table of HARQ process mappings according to some embodiments.
FIG. 13 is a flow chart illustrating operations of mapping HARQ processes.

Since only two HARQ processes are supported for three stream transmissions and four stream transmissions, there may be need for a mapping table to map the four local ACK/NAK's to two HARQ ACK/NAK's (i.e., two HARQ processes). The table of FIG. 12 shows such a mapping table when two layers are mapped to one HARQ process. The HARQ process maps the passed transport blocks to the upper layers. That is, once the HARQ decides the transport blocks whose cyclic redundancy check, CRC, is passed (i.e., received and decoded without errors), it sends the ACK to the Node B and also tunnels these transport blocks to the upper layers (i.e., L2/L3).

The functionality of FIG. 12 can be expressed in some embodiments of a method as illustrated in FIG. 13. In a reception step 702 transport blocks are received. In a HARQ step 704, HARQ processing takes place as described above and, in an output step 706, the mapped ACK/NAK's are output.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of present inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and That which is claimed is:

1. A method of transmitting data from a wireless network node over a MIMO channel to a wireless terminal, the method comprising:
    transmitting first and second transport data blocks to the wireless terminal over the MIMO channel; and
    responsive to receiving a NACK message from the wireless terminal corresponding to the first and second transport data blocks, retransmitting the first and second transport data blocks to the wireless terminal over the MIMO channel.

2. The method according to claim 1 further comprising:
    responsive to receiving the NACK message from the wireless terminal corresponding to the first and second transport data blocks, transmitting a retransmission data indicator to the wireless terminal to indicate retransmission of both of the first and second transport data blocks.

3. The method according to claim 2 wherein the initial transmission data indicator is a one bit data indicator indicating retransmission of both of the first and second transport data blocks.

4. The method according to claim 2, the method further comprising:
    responsive to receiving an ACK message from the wireless terminal corresponding to the first and second transport data blocks, transmitting third and fourth transport data blocks to the wireless terminal over the MIMO channel after retransmitting the first and second transport data blocks.

5. The method according to claim 4 further comprising:
    responsive to receiving the ACK message from the wireless terminal corresponding to the first and second transport data blocks after retransmitting the first and second data blocks, transmitting (819) an initial transmission data indicator to the wireless terminal to indicate initial transmission of both of the third and fourth transport data blocks, wherein the retransmission data indicator and the initial transmission data indicator have different values.

6. The method according to claim 1, the method further comprising:
    transmitting a third transport data block to the wireless terminal over the MIMO channel when transmitting the first and second transport data blocks; and
    responsive to receiving a NACK message from the wireless terminal corresponding to the third transport data block transmitted, retransmitting the third transport data block to the wireless terminal over the MIMO channel when retransmitting the first and second transport data blocks.

7. The method according to claim 6 further comprising:
    responsive to receiving the NACK message from the wireless terminal corresponding to the third transport data block, transmitting a retransmission data indicator to the wireless terminal to indicate retransmission of the third transport data block.

8. The method according to claim 6, the method further comprising:
    responsive to receiving an ACK message from the wireless terminal corresponding to the third transport data block after transmitting the first, second, and third transport data blocks, transmitting a fourth transport data block to the wireless terminal over the MIMO channel.

9. The method according to claim 1 further comprising:
    responsive to receiving an ACK message from the wireless terminal corresponding to the first and second transport data blocks, transmitting third and fourth transport data blocks to the wireless terminal over the MIMO channel.

10. The method according to claim 9 further comprising:
    responsive to receiving the ACK message from the wireless terminal corresponding to the first and second transport data blocks, transmitting an initial transmission data indicator to the wireless terminal to indicate initial transmission of both of the third and fourth transport data blocks.

11. The method according to claim 1 wherein the NACK message comprises a first NACK message, the method further comprising:
    transmitting third and fourth transport data blocks to the wireless terminal over the MIMO channel when transmitting the first and second transport data blocks; and
    responsive to receiving a second NACK message from the wireless terminal corresponding to the third and fourth transport data blocks, retransmitting the third and fourth transport data blocks to the wireless terminal over the MIMO channel when retransmitting the first and second transport data blocks;
    wherein the first transport data block is transmitted using a first MIMO transmission stream, wherein the third transport data block is transmitted using a second MIMO transmission stream, wherein the fourth transport data block is transmitted using a third MIMO transmission stream, and wherein the second transport data block is transmitted using a fourth MIMO transmission stream.

12. The method of claim 1 wherein the first and second transport data blocks are transmitted over different MIMO transmission streams of the MIMO channel.

13. The method according to claim 12 wherein transmitting the first and second transport data blocks comprises transmitting the first and second transport data blocks using a first transmission time interval (TTI), wherein retransmitting the first and second transport data blocks comprises retransmitting the first and second transport data blocks using a second TTI, and wherein the first and second transport data blocks are separately encoded.

14. A wireless network node configured to provide wireless communication with a wireless terminal over a MIMO channel, the wireless network node comprising:
    a transceiver configured to transmit communications to the wireless terminal and to receive communications from the wireless terminal; and
    a processor coupled to the transceiver, wherein the processor is configured to transmit first and second transport data blocks through the transceiver to the wireless terminal over the MIMO channel, and to retransmit the first and second transport data blocks through the transceiver to the wireless terminal over the MIMO channel responsive to receiving a NACK message from the wireless terminal through the transceiver corresponding to the first and second transport data blocks.

15. The wireless network node according to claim 14 wherein the NACK message comprises a first NACK message, and wherein the processor is further configured to
    transmit third and fourth transport data blocks to the wireless terminal over the MIMO channel when transmitting the first and second transport data blocks, and to retransmit the third and fourth transport data blocks to the wireless terminal over the MIMO channel when retransmitting the first and second transport data blocks responsive to receiving a second NACK message from the wireless terminal corresponding to the third and fourth transport data blocks;

wherein the first transport data block is transmitted using a first MIMO transmission stream, wherein the third transport data block is transmitted using a second MIMO transmission stream, wherein the fourth transport data block is transmitted using a third MIMO transmission stream, and wherein the second transport data block is transmitted using a fourth MIMO transmission stream.

16. The wireless network node according to claim 14 wherein the processor is further configured to,
transmit a retransmission data indicator to the wireless terminal to indicate retransmission of both of the first and second transport data blocks responsive to receiving the NACK message from the wireless terminal corresponding to the first and second transport data blocks.

17. The wireless network node of claim 14 wherein the first and second transport data blocks are transmitted over different MIMO transmission streams of the MIMO channel.

18. The wireless network node according to claim 17 wherein the processor is configured to transmit the first and second transport data blocks using a first transmission time interval (TTI), and to retransmit the first and second transport data blocks using a second TTI, and wherein the first and second transport data blocks are separately encoded.

19. A method of receiving data at a wireless terminal from a wireless network node over a MIMO channel, the method comprising:
receiving first and second transport data blocks from the wireless network node over the MIMO channel; and
responsive to failing to decode at least one of the first and second transport data blocks, transmitting a NACK message corresponding to both of the first and second transport data blocks to the wireless network node.

20. The method according to claim 19 further comprising:
responsive to successfully decoding both of the first and second transport data blocks, transmitting an ACK message corresponding to both of the first and second transport data blocks to the wireless network node.

21. The method according to claim 19 further comprising:
receiving a third transport data block from the wireless network node over the MIMO channel when receiving the first and second transport data blocks; and
responsive to failing to decode the third transport data block, transmitting a NACK message corresponding to the third transport data block to the wireless network node.

22. The method according to claim 21 further comprising:
responsive to successfully decoding the third transport data block, transmitting an ACK message corresponding to the third transport data block to the wireless network node.

23. The method according to claim 19, wherein the NACK message comprise a first NACK message, the method further comprising:
receiving third and fourth transport data blocks from the wireless network node over the MIMO channel when transmitting the first and second transport data blocks; and
responsive to failing to decode at least one of the third and fourth transport data blocks, transmitting a second NACK message corresponding to both of the third and fourth transport data blocks to the wireless network node;
wherein the first transport data block is received using a first MIMO reception stream, wherein the third transport data block is received using a second MIMO reception stream, wherein the fourth transport data block is received using a third MIMO reception stream, and wherein the second transport data block is received using a fourth MIMO reception stream.

24. The method according to claim 19 wherein transmitting the NACK message comprises transmitting the NACK message responsive to failing to decode one of the first and second transport data blocks and successfully decoding the other of the first and second transport data blocks.

25. The method of claim 19 wherein the first and second transport data blocks are received over different MIMO reception streams of the MIMO channel.

26. The method according to claim 25 wherein receiving the first and second transport data blocks comprises receiving the first and second data blocks using a transmission time interval (TTI), and wherein the first and second transport data blocks are separately decoded.

27. A wireless terminal configured to provide communication with a wireless network node over a MIMO channel, the wireless terminal comprising:
a transceiver configured to transmit communications to the wireless network node and to receive communications from the wireless network node; and
a processor coupled to the transceiver wherein the processor is configured to receive first and second transport data blocks through the transceiver from the wireless network node over the MIMO channel, and to transmit a NACK message corresponding to both of the first and second transport data blocks through the transceiver to the wireless network node responsive to failing to decode at least one of the first and second transport data blocks.

28. The wireless terminal according to claim 27, wherein the processor is further configured to transmit an ACK message corresponding to both of the first and second transport data blocks through the transceiver to the wireless network node responsive to successfully decoding both of the first and second transport data blocks.

29. The wireless terminal according to claim 27, wherein the NACK message comprise a first NACK message, and wherein the processor is further configured to receive third and fourth transport data blocks through the transceiver from the wireless network node over the MIMO channel when receiving the first and second transport data blocks, and to transmit a second NACK message corresponding to both of the third and fourth transport data blocks to the wireless network node responsive to failing to decode at least one of the third and fourth transport data blocks;
wherein the first transport data block is received using a first MIMO reception stream, wherein the third transport data block is received using a second MIMO reception stream, wherein the fourth transport data block is received using a third MIMO reception stream, and wherein the second transport data block is received using a fourth MIMO reception stream.

30. The wireless terminal according to claim 27 wherein the processor is configured to transmit the NACK message responsive to failing to decode one of the first and second transport data blocks and successfully decoding the other of the first and second transport data blocks.

31. The wireless terminal of claim 27 wherein the first and second first and second transport data blocks are received over different MIMO reception streams of the MIMO channel.

32. The wireless terminal of claim 31 wherein the processor is configured to receiving the first and second transport data blocks using a transmission time interval (TTI), and wherein the first and second transport data blocks are separately decoded.

* * * * *